United States Patent
Sechrist et al.

[19]

[11] Patent Number: 5,965,473
[45] Date of Patent: *Oct. 12, 1999

[54] CYCLIC CATALYTIC HYDROCARBON CONVERSION PROCESS WITH REDUCED CHLORIDE EMISSIONS

[75] Inventors: Paul A. Sechrist, Des Plaines; Delmar W. Robinson, Palatine, both of Ill.

[73] Assignee: UOP LLC, Des Plaines, Ill.

[ * ] Notice: This patent is subject to a terminal disclaimer.

[21] Appl. No.: 08/764,868

[22] Filed: Dec. 13, 1996

Related U.S. Application Data

[63] Continuation-in-part of application No. 08/724,652, Oct. 3, 1996, Pat. No. 5,837,636.
[60] Provisional application No. 60/005,764, Oct. 20, 1995.
[51] Int. Cl.⁶ ...................................................... B01J 20/34
[52] U.S. Cl. ............................... 502/35; 502/50; 502/52; 208/139; 208/140; 423/240 S
[58] Field of Search .................... 208/139, 140; 95/132; 423/240 S; 502/52, 50, 35

[56] References Cited

U.S. PATENT DOCUMENTS

| | | | |
|---|---|---|---|
| 2,773,014 | 12/1956 | Snuggs et al. | 196/50 |
| 2,880,168 | 3/1959 | Feller | 208/140 |
| 3,652,231 | 3/1972 | Greenwood et al. | 208/140 |
| 3,939,061 | 2/1976 | Paynter et al. | 208/140 |
| 4,406,775 | 9/1983 | Bailor et al. | 208/140 |
| 5,001,095 | 3/1991 | Sechrist | 208/140 |
| 5,336,834 | 8/1994 | Zarchy et al. | 585/737 |
| 5,376,607 | 12/1994 | Sechrist | 502/52 |

*Primary Examiner*—Michael Lewis
*Assistant Examiner*—Peter DiMauro
*Attorney, Agent, or Firm*—Thomas K. McBride; John G. Tolomei; Michael A. Moore

[57] ABSTRACT

A method is disclosed for recovering chlorine-containing species from the outlet gas of a hydrocarbon conversion process with a cyclic regeneration operation. The outlet gas from an off-stream catalyst bed in which regeneration is occurring is passed to another off-stream catalyst bed which contains spent catalyst and which is maintained at sorption conditions. The spent catalyst particles sorb the chlorine-containing species from the outlet gas. This method captures and retains within the hydrocarbon conversion process chlorine-containing species that would otherwise be scrubbed and lost from the process and that would need to be replaced by the injection of make-up chlorine-containing species. This method results in significant savings in operating costs of a cyclic regeneration process. This method is adaptable to many processes for the catalytic conversion of hydrocarbons in which deactivated catalyst are regenerated by a cyclic regeneration operation.

22 Claims, 2 Drawing Sheets

CYCLIC CATALYTIC HYDROCARBON CONVERSION PROCESS WITH REDUCED CHLORIDE EMISSIONS

CROSS-REFERENCE TO RELATED APPLICATION

This application is a continuation-in-part of prior application Ser. No. 08/724,652, filed Oct. 3, 1996, now U.S. Pat. No. 5,837,636 and claims the benefit of U.S. Provision Application No. 60/005,764, filed on Oct. 20, 1995.

FIELD OF THE INVENTION

This invention relates generally to the regeneration of hydrocarbon conversion catalysts in the presence of a chlorine-containing species.

BACKGROUND OF THE INVENTION

Although catalysts for the conversion of hydrocarbons have a tendency to deactivate, a catalyst's activity can usually be restored by one of a number of processes that are known generally as regeneration processes. Regeneration processes are extensively used. What specific steps comprise a regeneration process depends in part on the reason for the deactivation. For example, if the catalyst deactivated because coke deposits accumulated on the catalyst, regeneration usually includes removing the coke by burning. If the catalyst deactivated because a catalytic metal such as platinum became agglomerated, regeneration usually includes redispersing the metal by contacting the catalyst with oxygen and chlorine. If the catalyst deactivated because a catalytic promoter such as chloride became depleted, regeneration usually includes replenishing the promoter by contacting the catalyst with one of a number of chlorine-containing species, which are referred to herein as chloro-species. Operating conditions and methods for these regeneration processes are well known.

Although some regeneration processes require that the catalyst be withdrawn from the vessel in which the hydrocarbon conversion takes place and be transported to a separate regeneration zone for reactivation, many regeneration processes can be carried out in situ. In situ regeneration is preferred especially for soft or brittle catalysts that attrit too readily when transported mechanically or pneumatically. In situ regeneration processes generally comprise two types of operations, a semiregenerative operation and a cyclic operation. In practicing the semiregenerative operation, the catalyst is maintained in continuous use over an extended period of time, say from five months to a year or more, depending on factors such as the quality of the catalyst and the nature of the feedstock. Following this extended period of operation, the reforming catalyst bed is taken off-stream while the catalyst is regenerated. In practicing the cyclic operation, the catalyst is generally regenerated with a greater frequency than in the semiregenerative operation. The cyclic operation uses multiple fixed catalyst beds arranged for serial flow of the feedstock in such a manner that at least one catalyst bed can be taken off-stream while the catalyst is regenerated. One or more companion catalyst beds remain on-stream, or go on-stream, to replace the catalyst bed that is off-stream. Subsequently, after the off-stream catalyst bed has had its catalyst regenerated and has again been placed on-stream, another catalyst bed can be taken off-stream and its catalyst is regenerated in like manner. A cyclic operation has the advantage over a semiregenerative operation of maintaining production of converted hydrocarbons while the catalyst is being regenerated.

Many cyclic regeneration operations share the common feature of contacting the catalyst with one or more chloro-species that can restore the activity of the catalyst. Usually this contacting is performed by dispersing the chloro-species in a recycle gas stream and passing the recycle gas stream through a bed of catalyst. A flue gas stream containing chloro-species and water is withdrawn from the catalyst bed and cooled, and then a portion of the flue gas stream is usually rejected from the cyclic regeneration operation. To compensate for the rejected portion of the flue gas steam, a make-up stream is usually combined with the remaining portion of the flue gas stream, thereby forming the recycle gas stream. The recycle gas stream is recycled to the catalyst bed by a recycle gas compressor. Thus, the recycle gas stream usually contains chloro-species and water. In addition, the recycle gas stream comes into contact with internal parts of the recycle gas compressor that usually operate at a temperature below the dew point temperature of the recycle gas stream. Consequently, a common risk associated with cyclic regeneration operations is the condensation of corrosive hydrochloric acid within the recycle gas compressor, which can cause serious damage and require costly repairs or even replacement of the recycle gas compressor. This risk of corrosion can be decreased by two methods. One method is scrubbing the flue gas stream with an aqueous, basic solution that neutralizes the chloro-species, and the other method is adsorbing the chloro-species from the flue gas on an adsorbent. Scrubbing is the more common of the two methods, particularly in cyclic regeneration of reforming catalysts and of catalysts for other hydrocarbon conversion processes, such as dehydrogenation, isomerization, alkylation, and transalkylation.

Although these two methods—scrubbing and adsorption—for decreasing the risk of corrosion within the recycle gas compressor of a cyclic regeneration operation are useful, they are also expensive and troublesome to operate. On the one hand, by introducing an aqueous solution into the flue gas, scrubbing can actually increase the risk of corrosion within the recycle gas compressor unless the alkalinity of the aqueous solution is carefully controlled. Moreover, because the aqueous solution must be replaced periodically, scrubbing gives rise to significant costs for supplying fresh solution and for disposing of the spent solution. On the other hand, although adsorption does not involve the introduction of an aqueous stream, the adsorbent also must be replaced periodically, and the cost of replacement of the adsorbent, including the cost of disposing of spent adsorbent, can far exceed the cost of replacement of the aqueous solution in scrubbing.

The problem of adsorbent replacement is compounded by water in the flue gas stream and, as a result, traditional adsorbents are not economically viable for adsorbing chloro-species from flue gas streams in cyclic regeneration operations. In order to be economically viable, an adsorbent, while removing a high proportion of the chloro-species from the flue gas stream, must adsorb typically from 7 to 8 percent of its weight in chloride. In order to adsorb that much chloride, the flue gas must have a low water content, typically less than 0.01 mol-% water. Water competes with chloro-species for adsorption sites on the adsorbent, and by occupying sites that would otherwise be occupied by chloro-species, water hinders the adsorption of chloride and hastens replacement of the adsorbent. Thus, if the flue gas has a high water content, the adsorbent adsorbs too much water and is incapable of adsorbing a viable amount of chloride. Because water is a common by-product of coke combustion as a result of the hydrogen-containing compounds typically found in coke, and because coke combustion is one of the common cyclic regeneration steps, flue gas streams often do have a high water content, typically from 1 to 10 mol-%. As a consequence, unless the flue gas is dried, an adsorbent will adsorb only one-third to one-half of the weight of chloride required for economic viability. This, in turn, doubles or triples the frequency of adsorbent replacement, thereby making traditional adsorbents uneconomical. Although in theory the adsorption of water can be mitigated by drying the flue gas stream prior to adsorbing the chloro-species, in fact a drier is costly, as well as impractical, because chloro-species such as hydrogen chloride tend to degrade most desiccants.

Thus, a process is sought for removing hydrogen chloride and other chloro-species from the flue gas streams of cyclic catalyst regeneration operations without the need for aqueous solutions, adsorbents, and desiccants.

SUMMARY OF THE INVENTION

It has been discovered that a catalyst that has an alumina support and that is about to be, but has not yet been, regenerated can sorb chlorine-containing species, which are referred to herein as chloro-species, from an offgas stream that is emitted during a cyclic regeneration operation. This discovery makes possible dramatic decreases in both the risk of corrosion within the recycle gas compressor; as well as the make-up addition of chloro-species during the cyclic regeneration operation. The observations that led to this discovery were made while contacting chloro-species-containing gas streams comprising nitrogen and oxygen with a fresh catalyst and with a spent catalyst having coke deposits. Thus, this sorption phenomenon is applicable to regeneration processes in which the catalyst is contacted with a gas stream comprising chloro-species and an oxidizing agent that oxidizes either the coke deposits or the catalytic metal, if present, of chloride-containing alumina particles. In addition, it is believed that the same sorption phenomenon would be observed if a gas stream comprising chloro-species and a reducing agent such as hydrogen was contacted with a spent catalyst. This realization is significant because it means that this sorption phenomenon is applicable to regeneration processes that reduce the catalytic metal of metal-containing and chloride-containing alumina particles. In other words, this sorption phenomenon allows chloro-species to be sorbed not only from a combustion flue gas stream but also from a reduction offgas stream.

In order to take advantage of this property of these spent catalysts to sorb chloride from a regeneration offgas stream, a chloride sorption step that can be readily integrated into existing cyclic regeneration operations without large capital expenditures or greatly increased complexity is provided. This invention is particularly applicable to cyclic regeneration operations that combust coke from coked, chloride-containing alumina particles, especially spent naphtha reforming catalysts and spent paraffin dehydrogenation catalysts.

In this invention, a sorption step in combination with a cyclic regeneration operation retains within a hydrocarbon conversion process most of the chloro-species that prior art cyclic regeneration operations remove or otherwise reject from the process. This invention uses sorption to capture the chloro-species escaping from a catalyst bed that is being regenerated, to reuse the chloro-species in the cyclic regeneration operation, and to minimize the risk of condensation of hydrochloric acid and hence corrosion in the recycle gas compressor, if present. Unlike conventional caustic scrubbing methods, this invention uses sorption to capture chloro-species released from catalyst that is being regenerated. Unlike conventional adsorption methods that use a separate adsorbent which becomes loaded with chloro-species and then is discarded, this invention uses spent catalyst in a catalyst bed that is about to be regenerated to capture most of the chloro-species that are in the flue gas stream and to return the chloro-species to the cyclic regeneration operation as chloride on the spent catalyst. In other words, this invention uses the catalyst that is about to be, but has not yet been, regenerated to keep chloro-species within the cyclic regeneration operation and to sustain the chloride level on the catalyst.

It has been discovered that, even though the spent catalyst that has not yet been regenerated is like traditional sorbents in that it is capable of sorbing up to, say, only about from 2 to 3 percent of its weight in chloride from a water-containing regeneration offgas stream of a cyclic regeneration operation, a process that uses the catalyst that is about to be regenerated to sorb chloro-species from the cyclic regeneration offgas stream is useful because of the large quantity of catalyst available for sorption. Accordingly, in one of its embodiments, this invention is a process in which spent catalyst that is about to be regenerated is contacted with the offgas stream in a catalyst bed that is not at either reaction or regeneration conditions but rather at sorption conditions. At sorption conditions, the spent catalyst sorbs chloro-species from the cyclic regeneration offgas. Because the cyclic regeneration offgas has a relatively high water content, the spent catalyst sorbs up to, say, only about from 2 to 3 percent of its weight in chloride. The spent catalyst, having sorbed what chloride it can, is then regenerated by contacting the spent catalyst with a regenerant gas at regeneration conditions. Thus, whatever additional chloride the spent catalyst sorbed while the catalyst bed was at sorption conditions is present on the catalyst at the start of regeneration, thereby decreasing the need to add make-up chloride to catalyst during regeneration. Meanwhile, as the catalyst in that catalyst bed is being regenerated, another catalyst bed that had been catalyzing hydrocarbon conversion reactions is at sorption conditions and its spent catalyst is being contacted with offgas from the catalyst bed that is undergoing regeneration. Thus, the other catalyst bed takes over the sorption function of the catalyst bed that is undergoing regeneration. Accordingly, every time a catalyst bed is switched from sorbing chloro-species to being regenerated, that catalyst bed is replaced by another catalyst bed that is switched from converting hydrocarbons to sorbing chloro-species. Thus, there is a continual progression of catalyst beds containing spent catalyst that is capable of being made available for sorption purposes and that is more than sufficient to compensate for the fact that the spent catalyst sorbs only up to about 2 to 3 percent of its weight in chloride. In short, in this invention an abundant quantity of catalyst that is available for sorption more than compensates for what persons skilled in the art would consider a small and uneconomical amount of chloride sorbed by the catalyst. The benefits of this invention for the cyclic regeneration operation include a decrease in the concentration of chloro-species in the offgas, a decrease in the rate of addition, if any, of make-up chloro-species to the recycle gas, and a decrease in the rate of usage and subsequent disposal of aqueous solution, if any, that is used for scrubbing.

In cyclic regeneration operations as currently commercially practiced, the flue gas from a zone in which coke is combusted from chlorided platinum alumina catalysts typically contains from 10 to 500 mol-ppm chlorine and from 500 to 10000 mol-ppm hydrogen chloride. By practicing this invention in which a high proportion of the chlorine and hydrogen chloride in the flue gas is sorbed on the coked catalyst prior to the combustion of the coke, the chlorine concentration in the flue gas may be reduced to the range of from 1 to 10 mol-ppm and the hydrogen chloride concentration may be reduced to the range of from 10 to 1000 mol-ppm. The method of this invention can be used to supplement or replace conventional means for removing chlorine and hydrogen chloride from flue gas streams, such as scrubbing or adsorption. In either case, this invention significantly lowers the substantial costs of building and operating the conventional means of chloro-species removal. In addition, this invention reduces significantly the requirements for adding make-up chloride to the cyclic regeneration operation, because this invention returns to the cyclic regeneration operation a large portion of the chlorine or hydrogen chloride that would otherwise be removed from the process by conventional means of chloro-species removal, such as flue gas scrubbing. Thus, the method of this invention can eliminate or drastically reduce the problems and costs associated with cyclic regeneration operations in which catalyst that is being regenerated emits a flue gas stream containing hydrogen chloride or chlorine.

This invention is applicable to numerous hydrocarbon conversion processes and to their associated cyclic catalyst regeneration operations. A basic requirement for using this invention is a catalyst bed that contains catalyst that is regenerated in the presence of chloride which is carried out of the zone in the form of a chloro-species by an outlet stream. Examples of chloro-species that are released from the zone and are susceptible to recovery by the method of this invention include $Cl_2$ and HCl. Another basic requirement for using this invention is a catalyst that has sorption capacity for the chloro-species. This invention is not limited to any particular type of catalyst; any catalysts with the necessary capacity may be used. Preferably, the catalyst will recover 50 wt-% and, more preferably, more than 90 wt-%, of the chloro-species in the outlet stream. The typical catalysts suitable for use in this invention comprise alumina, including alumina, activated aluminas, silica alumina, molecular sieves, and alumino-silicate clays such as kaolin, attapulgite, sepiolite, polygarskite, bentonite, and montmorillonite, particularly when the clays have not been washed by acid to remove substantial quantities of alumina. Reference is made to Zeolitic Molecular Sieves, by Donald W. Breck (John Wiley & Sons, 1974), which describes the use and selection of zeolite adsorbents and which is incorporated herein by reference.

The sorption and removal capacity of the catalyst for the chloro-species must exist under a reasonable range of conditions. With respect to the removal capacity, the capability for chloride to be removed from the catalyst during regeneration is a necessary feature of the cyclic catalyst regeneration operation to which the invention is applied. In other words, the conditions at which the cyclic regeneration occurs are conditions that are sufficient to remove chloride from the catalyst. As a practical matter, however, this requirement does not limit the scope of this invention in any significant way. With respect to the capacity of the catalyst to sorb chloro-species, preferably the process conditions of the offgas will complement the sorption requirements of the catalyst. In a surprising aspect of this invention, the sorption of chloro-species is favored by a decrease rather than an increase in the pressure of sorption. Although persons of ordinary skill in the art of sorption processes would have expected that a decrease in pressure would not have been beneficial for the sorption of gaseous chloro-species onto the catalyst, it has been discovered that the opposite is true in the presence of water and at the temperatures of the sorption. It has been discovered that although a decrease in pressure causes the sorption of water from the offgas onto the catalyst to decrease, the sorption of chloro-species does not decrease, even at the temperatures of the sorption. Therefore, a decrease in pressure selectively favors the sorption of chloro-species relative to that of water. Consequently, a preferred embodiment of this invention includes operating the catalyst bed in which sorption is occurring at a pressure that is less than the pressure of the catalyst bed in which regeneration is occurring. This embodiment may be well suited for those prior art cyclic regeneration operations that employ a recycle gas compressor to circulate a recycle gas stream through catalyst beds and where the suction pressure of the recycle gas compressor is less than the discharge pressure. In such prior art processes, it is somewhat beneficial to perform the sorption of the chloro-species on the catalyst at or near the relatively low pressure of the recycle gas compressor suction and the regeneration at or near the relatively high pressure of the recycle gas compressor discharge. All other factors being the same, however, the favorable increase in sorption that occurs as a result of a decrease in pressure diminishes as the total pressure of the catalyst beds increases. Thus, because cyclic regeneration operations generally operate at an elevated pressure and because the difference between the suction and discharge pressures of the recycle gas compressor is generally relatively small, the benefit of a lower pressure for the sorption zone, although present, may not be substantial.

This invention is not limited to the recovery and reuse of a single chloro-species in a cyclic regeneration process, but may include arrangements for the recovery of two or more chloro-species. Preferably, the catalyst in a single catalyst bed will sorb all of the various chloro-species that are present in the offgas stream. Where necessary, multiple catalyst beds operating at different sorption conditions may be used to recover the various chloro-species from the offgas stream.

Thus, this invention uses a sorption step in combination with a regeneration step in a cyclic catalyst regeneration operation of a hydrocarbon conversion process that results in the recovery and return of chloro-species to the process. This invention is compatible with a wide variety of existing cyclic catalyst regeneration operations and typical cyclic regeneration conditions.

It is an object of this invention to improve processes for cyclic regeneration of hydrocarbon conversion catalysts that use chloro-species.

It is another object of this invention to recover chloro-species that are present during cyclic catalyst regeneration.

A further object of this invention is to decrease the costs that are incurred in removing chloro-species from cyclic catalyst regeneration processes.

Accordingly, this invention is in one embodiment a sorptive method for recovering chloro-species from an outlet stream of a cyclic regeneration operation of a hydrocarbon conversion process. The hydrocarbon conversion process has at least three catalyst beds. In a first catalyst bed, hydrocarbons are contacted with a catalyst in order to convert hydrocarbons. At least a portion of an outlet stream comprising a chloro-species is passed to a second catalyst bed containing the catalyst. At least a portion of the chloro-species is sorbed on the catalyst in the second catalyst bed at sorption conditions. An effluent stream having a decreased concentration of the chloro-species relative to the portion of the outlet stream is withdrawn from the second catalyst bed. In a third catalyst bed, the catalyst containing chloride is at least partially regenerated and at least a portion of the chloride is removed from the catalyst at regeneration conditions. The outlet stream is withdrawn from the third catalyst bed. Periodically, the functions of the first, second and third catalyst beds are shifted. The first catalyst bed is operated to function as the second catalyst bed, the second catalyst bed is operated to function as the third catalyst bed, and the third catalyst bed is operated to function as the first catalyst bed.

In a more limited embodiment, this invention is a sorptive method for recovering chlorine or hydrogen chloride from the flue gas of a cyclic regeneration operation of a hydrocarbon reforming process. The hydrocarbon reforming process has at least three reforming catalyst beds. A feed stream comprising hydrocarbons having a boiling range of from 180 to 400° F. is passed to a first reforming catalyst bed containing reforming catalyst. The reforming catalyst comprises alumina, platinum metal, and chloride. In the first reforming catalyst bed, the hydrocarbons are reformed at reforming conditions sufficient to deposit coke on the reforming catalyst. An exit stream is withdrawn from the first reforming catalyst bed and passed to a first separation zone. A product stream comprising reformed hydrocarbons is recovered from the first separation zone. A regenerant stream comprising nitrogen, oxygen, and at least one of hydrogen chloride and chlorine is passed to a second reforming catalyst bed. The second reforming catalyst bed contains the reforming catalyst comprising chloride and having coke deposited thereon. At regeneration conditions, at least a portion of the coke and the chloride is removed from the reforming catalyst in the second reforming catalyst bed. A flue gas stream comprising nitrogen and at least one of chlorine and hydrogen chloride is withdrawn from the second reforming catalyst bed. The flue gas stream is cooled to produce a cooled flue gas stream that is passed to a third reforming catalyst bed. The third reforming catalyst bed contains the reforming catalyst having coke deposited thereon. A portion of at least one of chlorine and hydrogen chloride is removed from the cooled flue gas stream by sorption on the reforming catalyst in the third reforming catalyst bed. An effluent stream comprising nitrogen and having a decreased concentration of chlorine or hydrogen chloride relative to the cooled flue gas stream is withdrawn from the third reforming catalyst bed. Periodically, the functions of the first, second and third reforming catalyst beds are shifted. The first reforming catalyst bed is operated to function as the second reforming catalyst bed, the second reforming catalyst bed is operated to function as the third reforming catalyst bed, and the third reforming catalyst bed is operated to function as the first reforming catalyst bed.

Other objects, embodiments and details of this invention are presented in the following detailed description of the invention.

INFORMATION DISCLOSURE

U.S. Pat. No. 2,773,014 (Snuggs et al.) discloses a reforming process with cyclic catalyst regeneration in which an alternate off-stream catalyst bed can take the place of any one of three on-stream catalyst beds by an arrangement of valves and connections.

U.S. Pat. No. 5,336,834 (Zarchy et al.) discloses an adsorption zone in combination with a catalytic hydrocarbon conversion process that keeps chlorine-containing compounds in the catalyst bed and prevents contamination of product streams with chlorine-containing compounds.

DETAILED DESCRIPTION OF THE INVENTION

This invention can be used to recover halogen-containing species in an outlet stream of a cyclic regeneration operation of a catalytic hydrocarbon conversion process that uses a catalyst that can sorb halogen-containing species and from which halogens can be removed. Although halogens may include fluorine, bromine, and iodine, the preferred halogen is chlorine. Accordingly, this invention is particularly applicable to decreasing the concentration of chloro-species in the outlet stream of a cyclic regeneration operation. The term "chloro-species" herein refers to any molecule that contains chlorine, other than the chloride component or chloride entities that exist on the catalyst. For example, chloro-species include chlorine, hydrogen chloride, chlorinated hydrocarbons with or without oxygen, and compounds containing chlorine and a metal. The term "chlorine" herein refers to elemental chlorine, which exists as a diatomic molecule at standard conditions. The term "chloride" when used alone herein refers to the chloride component or chloride entities that exist on the catalyst. Chloride on the catalyst is believed to exist as various compounds depending on the composition and conditions of the catalyst. For example, if the catalyst contains alumina then the chloride may exist on the catalyst as an entity consisting of chlorine, oxygen, hydrogen, and aluminum atoms.

Other specific terminology is used herein to refer to the catalyst as it progresses through the various stages of the method of this invention. The term "spent catalyst" refers to catalyst that has become deactivated or otherwise manifests a decline in hydrocarbon conversion performance usually as a result of reactions that take place in the hydrocarbon conversion catalyst bed. Spent catalyst is catalyst that has not been used to sorb chloro-species from the outlet stream and has not been regenerated. The term "chlorided catalyst" refers to spent catalyst that has sorbed chloro-species from the outlet stream. Like spent catalyst, chlorided catalyst has not been regenerated. The term "regenerated catalyst" refers to catalyst that has undergone one or more steps of cyclic regeneration and has been at least partially regenerated. The term "combusted catalyst" refers to spent catalyst or chlorided catalyst that has had at least a portion of its coke removed by combustion, one of the cyclic regeneration steps. The coke content of combusted catalyst may be 0.01% by weight of the catalyst weight or less, but generally it is 0.2–0.5% by weight.

Terms used herein that refer to the streams that pass through the various zones of this invention are as follows. The terms "regenerant stream" and "regenerant gas stream" refer to a stream comprising a regeneration agent such as oxygen or chlorine that is passed to a catalyst bed in which regeneration is occurring. The term "outlet stream" refers to a stream comprising chloro-species that is withdrawn from a catalyst bed in which regeneration is occurring. The terms "offgas stream," "flue stream" and "flue gas stream" refer to particular kinds of outlet streams. The terms "effluent stream" and "effluent gas stream" refer to a stream having a reduced concentration of chloro-species relative to either the flue stream or the flue gas stream and which is withdrawn from a catalyst bed in which sorption is occurring. The terms "recycle stream" or "recycle gas stream" refer to a particular kind of regenerant stream or regenerant gas stream in which at least a portion of either the effluent stream or effluent gas stream forms or provides a portion of the regenerant stream or regenerant gas stream.

Generally, the catalysts that can sorb and desorb chloro-species comprise inorganic oxides, preferably alumina. The alumina may be present alone or it may be combined with a porous inorganic oxide diluent as a binder material. Alumina that has a high surface area is preferred. The alumina may be present in any of its solid phases, but gamma-alumina is preferred. The alumina may also be present as a chemical combination with other elements, such as in silica-aluminas or alumino-silicate clays. The catalyst may also be comprised of one or more metals in addition to the metal, if any, that comprises the inorganic oxide. Depending on the catalyst, this additional metal can comprise a transition metal such as a Group VIII noble metal (e.g., platinum). Because many hydrocarbon conversion catalysts comprise alumina, the hydrocarbon conversion catalysts that may be used with this invention are numerous. They include catalysts for reforming, dehydrogenation, isomerization, alkylation, transalkylation, and other catalytic conversion processes. These catalysts are well known. See, for example, U.S. Pat. Nos. 2,479,110 and 5,128,300 (reforming); U.S. Pat. Nos. 4,430,517 and 4,886,928 (dehydrogenation); U.S. Pat. Nos. 2,999,074 and 5,017,541 (isomerization); U.S. Pat. Nos. 5,310,713 and 5,391,527 (alkylation); and U.S. Pat. No. 3,410,921 (transalkylation). The teachings of these patents are incorporated herein by reference.

It is believed that the most widely-practiced processes with cyclic catalyst regeneration operations that produce offgas streams containing chloro-species and that also employ alumina-containing catalyst are cyclic catalytic hydrocarbon conversion processes. The most widely practiced cyclic hydrocarbon conversion process to which the present invention is applicable is cyclic catalytic reforming. Therefore the discussion of the invention herein will refer to its application to a cyclic catalytic reforming reaction system. It is not intended that this limit the scope of the invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a catalyst bed. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. No. 4,119,526 (Peters et al.); U.S. Pat. No. 4,409,095 (Peters); and U.S. Pat. No. 4,440,626 (Winter et al.).

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chloride. Alumina is a commonly used carrier. The preferred alumina materials are known as the gamma, eta and theta alumina with gamma and eta alumina giving the best results. An important property related to the performance of the catalyst is the surface area of the carrier. Preferably, the carrier will have a surface area of from 100 to about 500 $m^2/g$. It has been discovered that the greater the surface area of the carrier, the greater is the capacity of the catalyst to sorb chloride according to the method of this invention. Catalyst particles are usually cylindrical or spheroidal, having a diameter of from about $\frac{1}{16}$th to about $\frac{1}{8}$th inch (1.5–3.1 mm), though they may be as large as $\frac{1}{4}$th inch (6.35 mm). When cylindrical, the catalyst particles have a length of from about $\frac{1}{8}$th to about $\frac{1}{4}$th inch (3.1–6.35 mm). In a particular catalyst bed, however, it is desirable to use catalyst particles which fall in a relatively narrow size range. A preferred catalyst particle diameter is $\frac{1}{16}$th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be regenerated before it can be reused in a reforming process.

In a common form, a catalytic reforming process with cyclic catalyst regeneration will employ four catalyst beds. The catalyst beds can be any of the well-known arrangements for contacting solid catalyst particles with a hydrocarbon gas stream and performing reforming reactions. Although a catalyst bed can comprise a fluidized, ebuliated, or bubbling bed of catalyst, the most common catalyst bed for cyclic reforming comprises a fixed bed of catalyst. Typically, at any given time three catalyst beds are on-stream and employed in catalyzing reforming reactions while one catalyst bed is off-stream, meaning that it is either being prepared for regeneration, undergoing regeneration, or being prepared for a return to reforming. Periodically, after regeneration of the off-stream catalyst bed has been completed, the off-stream catalyst bed is placed on-stream, replacing one of the on-stream catalyst beds which is itself then regenerated. Catalyst is generally not withdrawn from or transported to any catalyst bed, but instead remains as a fixed bed inside each catalyst bed both when it is catalyzing reforming reactions and when it is being regenerated. When a catalyst bed is being regenerated, the catalyst therein undergoes a multi-step regeneration process that is used to regenerate the catalyst to restore its full reaction promoting ability.

The inlets and outlets of the catalyst beds are connected to each other by conduits or pipelines, which contain valves or blinds. These valves or blinds can be opened in order to allow individual streams to flow to and from any particular catalyst bed, and they can be closed in order to block in or isolate a particular catalyst bed from any individual stream or streams. For example, for a catalyst bed containing catalyst that has completed the various regeneration steps, the valves in the inlets and outlets lines that connect the catalyst bed with regenerant gas streams and regeneration equipment are closed. At the same time, or shortly thereafter, the valves that connect the catalyst bed with the hydrocarbon streams and reforming equipment are opened. The reverse of these steps is performed for a catalyst bed containing catalyst that has become deactivated and is about to be regenerated.

Although reforming of hydrocarbons is undergoing continuously, it is often referred to as cyclic. By cyclic it is meant that each individual catalyst bed cycles back and forth between reforming and regeneration, or that the repeated taking off-stream of spent catalyst beds and repeated placing on-stream of regenerated catalyst beds is practiced in a cyclical pattern. For example, although a catalyst bed may be regenerated every 12 or 24 hours, any particular catalyst bed is typically regenerated less frequently, such as every 48, 72, 96 or more hours. The frequency at which any particular catalyst bed is regenerated depends on many factors, including the quantity of catalyst and on the rate of deactivation of the catalyst in the catalyst bed.

This invention is applicable to many of the individual regeneration steps that typically comprise a cyclic reforming catalyst regeneration operation. Generally, these steps involve contacting the catalyst in an off-stream, fixed bed catalyst bed with a recycle gas stream containing a regeneration agent, and withdrawing from the catalyst bed an offgas stream that contains chloro-species, and recycling a portion of the offgas stream to the catalyst bed. In the prior art, these steps also involve scrubbing or otherwise removing chloro-species from the offgas or recycle gas. One common example of such a step is coke combustion. If the recycle gas stream contains a low concentration of oxygen of typically from 0.5 to 1.5 vol-%, coke which could have accumulated on surfaces of the catalyst because of the reforming reactions can be removed by combustion. Coke is comprised primarily of carbon but is also comprised of a relatively small quantity of hydrogen, generally from 0.5 to 10 wt-% of the coke. The mechanism of coke removal includes oxidation to carbon monoxide, carbon dioxide, and water. The coke content of spent catalyst may be as much as 20% by weight of the catalyst weight, but 5–7% is a more typical amount. Coke is usually oxidized at temperatures ranging from 900 to 100° F. (482 to 538° C.), but temperatures in localized regions may reach 1100° F. (593° C.) or more. Because of these high temperatures and also because of high water concentrations, catalyst chloride is quite readily removed from the catalyst during coke combustion. Although the presence of chloro-species in the combustion recycle gas is not a requirement, the supplemental injection of chloro-species into the combustion recycle gas can help prevent too much catalyst chloride from being stripped away, and can also help prevent the catalyst metal from agglomerating. Coke combustion consumes oxygen, so a small stream of make-up gas is added to the flue gas to replace the consumed oxygen, and a small amount of flue gas is vented off to allow for the addition of the make-up gas. The steady addition of make-up gas, the venting of flue gas and, if used, scrubbing of the flue gas establishes a steady state condition during most of the coke combustion step that produces a nearly constant concentration of chloro-species, as well as of water and oxygen, in the recycle gas and in the flue gas.

Another example of a cyclic catalyst regeneration step to which this invention is applicable is redispersion of the catalyst metal. The redispersion recycle gas generally contains a higher concentration of oxygen than for coke combustion, usually from 2 to 21 vol-%. The redispersion recycle gas also generally contains either chlorine or another chloro-species that can be converted to chlorine at the redispersion conditions. The chlorine or chloro-species is generally introduced in a stream of carrier gas that is added to the redispersion recycle gas, and so a portion of the flue gas is vented off to allow for the addition of the carrier gas. The volumetric flow rates of the carrier gas stream and of the portion of the flue gas steam that is vented are relatively small in comparison to the volumetric flow rates of the redispersion recycle gas stream and the total flue gas stream. The steady addition of carrier gas, the venting of flue gas and, if used, scrubbing of the flue gas establishes a steady state condition that produces a nearly constant concentration of chlorine or chloro-species in the redispersion recycle gas and in the flue gas. Although the actual mechanism by which chlorine redisperses catalyst metal such as platinum is the subject of a variety of theories, it is generally recognized that the metal may be redispersed without increasing the catalyst chloride content. In other words, although the presence of chlorine is a requirement for metal redispersion to occur, once the metal has been redispersed it is generally recognized that it is not necessary that the catalyst chloride content be maintained above that of the catalyst prior to redispersion. Thus, the agglomerated metal of a catalyst can be redispersed without a net increase in the overall chloride content of the catalyst.

A third example of a cyclic regeneration step to which this invention is applicable is rechloriding of the catalyst. Although the rechloriding recycle gas must contain a chloro-species, the rechloriding recycle gas generally does not require the presence of oxygen unless it is needed to decompose the chloro-species in order to deposit chloride on the catalyst. The chloro-species is generally introduced in a relatively small stream of carrier gas that is added to the rechloriding recycle gas, and so a small amount of flue gas is vented off to allow for the addition of the carrier gas. Like coke combustion and metal redispersion, rechloriding that adds carrier gas and vents flue gas establishes steady state concentrations of chlorine or chloro-species in the recycle gas and in the flue gas.

A fourth example of a cyclic regeneration step to which this invention is applicable is reduction of the catalyst. The recycle gas must contain a reducing agent, which is usually hydrogen which oxidizes to water as the oxidation state of the catalyst metal reduces, usually to zero. At typical reduction conditions some of the water of reduction occupies catalyst surface sites and displaces chloride, which appears as hydrogen chloride in the outlet gas that is withdrawn from the cyclic catalyst bed. Although the presence of chloro-species in the recycle gas during reduction is not a requirement, a supplemental injection of chloro-species can help prevent an excessive amount of catalyst chloride from being stripped from the catalyst. In any event, recycling of hydrogen through the cyclic catalyst beds during reduction establishes steady state concentrations of water and chlorine or chloro-species in the recycle gas and in the outlet gas.

When applied to cyclic regeneration steps such as those just described and while one catalyst bed is off-stream for regeneration, this invention employs an additional catalyst bed off-stream for sorption of the chloro-species in the flue gas that is withdrawn from the catalyst bed that is being regenerated. So, unlike a typical cyclic reforming process where at any given time only one catalyst bed is off-stream, this invention employs at least two catalyst beds off-stream.

Accordingly, when a catalyst bed is taken off-stream in order for its catalyst bed to be regenerated, the first event that occurs is not regeneration of the spent catalyst. Rather, the catalyst bed is contacted first with the regeneration flue gas in order to sorb chloro-species and only thereafter is the catalyst bed regenerated. Consequently, in the cyclic regeneration process of this invention, each catalyst bed continually undergoes a three-step cycle consisting of on-stream reforming which produces spent catalyst, then off-stream sorption which produces chlorided catalyst, and finally off-stream regeneration which produces regenerated catalyst. After regeneration, the catalyst bed containing regenerated catalyst is placed back on-stream to promote more reforming reactions, thereby completing one cycle and starting the next.

The majority of the description of the embodiments of this invention is presented in terms of combusting coke in an off-stream catalyst bed of a reforming process with cyclic catalyst regeneration, because this is believed to be the most common application of this invention. However, this description is not intended to limit the scope of this invention as set forth in the claims.

Generally, the make-up gas during the combustion step of a cyclic regeneration of a reforming catalyst comprises air and most of the oxygen in the make-up air is consumed in the combustion of coke. Therefore, the flue gas generally contains from 70 to 80 mol-% nitrogen, from 10 to 20 mol-% carbon oxides, which is mainly carbon dioxide with trace amounts of carbon monoxide, and from 0.2 to 2.0 mol-% oxygen. Oxygen might, however, not be present in the flue gas stream if all of the oxygen in the regenerant gas stream is consumed in the combustion of coke. While nitrogen, carbon oxides, and oxygen are typical but not required components of the gas stream that is passed to the catalyst bed in which sorption is occurring, the gas stream must contain a chloro-species, such as hydrogen chloride or chlorine. The concentration of hydrogen chloride in the flue gas stream to the catalyst bed during sorption is generally from 500 to 10000 mol-ppm, and preferably from 1000 to 5000 mol-ppm. The concentration of chlorine in the flue gas stream to the catalyst bed during sorption is generally from 10 to 500 mol-ppm, and preferably from 25 to 100 mol-ppm. Water may also be present in the flue gas stream. The concentration of water in the flue gas stream to the catalyst bed during sorption is generally form 1 to 20 vol-%, and preferably from 2 to 5 vol-% because water competes with chloro-species for sorption on the catalyst particles. The flue gas stream may also contain trace amounts of other volatile chloro-species such as chlorinated hydrocarbons and chlorinated metals.

Sulfur, in the form of sulfur oxides such as sulfur dioxide and sulfur trioxide, is often present in the flue gas streams of the combustion step of cyclic catalyst regeneration processes. Hydrocarbon feedstocks are often contaminated with low concentrations of sulfur, some of which can sorb or deposit on the catalyst in the catalyst bed during reforming. Generally, when spent catalyst containing sulfur is contacted with oxygen during the combustion step of a cyclic catalyst regeneration process, the sulfur is typically converted to sulfur dioxide and trace amounts of sulfur trioxide, which appear in the flue gas from the catalyst bed that is being regenerated. These sulfur oxides can harm the performance of the catalyst by forming sulfates on the catalyst or by agglomerating the platinum metal. In order to avoid these harmful effects, it is preferred that the sulfur concentration of the hydrocarbon feedstock be maintained as low as possible in order to minimize the presence of the sulfur oxides in the flue gas.

The catalyst particles in a catalyst bed of a cyclic regeneration process are typically contained in an elongated bed having two elongated sides. In one common arrangement, the two elongated sides are open for transverse gas flow through the catalyst bed. In another common arrangement, the elongated bed has two ends, which are generally perpendicular to the elongated sides and which are open for axial gas flow through the bed. When the regenerant gas contacts the coked catalyst in the catalyst bed, the coke begins to burn. Generally, the flow rate, temperature, and oxygen concentration of the regenerant gas are controlled in order to produce a combustion front within the catalyst bed and to prevent the temperature of the combustion front from exceeding about 1050° F. (566° C.). Combusting coke in this manner is well known in the art of hydrocarbon processing. The combustion front passes slowly from the inlet to the outlet of the catalyst bed. The intensity of coke burning and the rate of progression of the combustion front through the catalyst bed can be controlled by monitoring the temperature at various locations within the bed or the bulk temperature of the flue gas stream leaving the bed.

When using the method of this invention to remove chloro-species from the flue gas, a portion of the flue gas stream is passed to an off-stream catalyst bed that contains spent catalyst that has not yet been combusted. Unlike prior art processes, the method of this invention does not use a separate adsorbent or caustic scrubbing to remove the chloro-species from the flue gas stream, but instead this invention uses the catalyst itself for the sorption. Catalyst is generally not withdrawn from or transported to the catalyst bed that is used for sorption, but preferably remains within the catalyst bed as a fixed bed, as when it is catalyzing reforming reactions and being regenerated. The direction of the flue gas flow through the catalyst bed is preferably cocurrent relative to the directions of the flow of the hydrocarbon combined feed and of the regenerant gas stream, but the flue gas direction can also be countercurrent, crosscurrent, or a combination of cocurrent, countercurrent, and crosscurrent.

The catalyst bed in which chloro-species are sorbed is operated at sorption conditions that are effective to sorb at least a portion of the chloro-species from the flue gas stream. Sorption conditions include a gas hourly space velocity of generally less than 100000 $hr^{-1}$ and preferably less than $50000^{-1}$. The chloride content of the spent catalyst prior to sorption may be as much as 5% by weight of the catalyst weight, but from 0.1 to 2.0% is a more typical amount. Although the spent catalyst particles that sorb chloro-species have a higher coke content than fresh catalyst particles, it has been discovered that spent catalyst particles have surprisingly similar capabilities for chloride retention as fresh catalyst particles. Accordingly, it is believed that spent catalyst particles have similar capabilities for chloride retention as oxidized catalyst particles. Thus, in order for sorption of chloro-species to occur in the off-stream catalyst bed through which the flue gas is passing, the operating conditions in that catalyst bed must be more favorable for sorption of chloro-species than the operating conditions of the catalyst bed in which the coke is being combusted. Generally, these more favorable conditions for sorption include a decreased temperature, a decreased pressure, or a decreased water content of the gas that contacts the catalyst. Preferably, the catalyst bed in which sorption occurs operates at a decreased temperature relative to the catalyst bed in which coke combustion occurs.

A cooler temperature in the catalyst bed in which sorption occurs relative to the catalyst bed in which combustion occurs can achieved in a variety of ways. Although either the spent catalyst in the catalyst bed in which sorption occurs can be cooled prior to beginning sorption or the catalyst bed may be equipped with cooling means to cool the flue gas or catalyst within the catalyst bed in which sorption occurs, the preferred method of maintaining a cooler temperature in the catalyst bed in which sorption occurs is by cooling the flue gas after leaving the catalyst bed in which combustion occurs and prior to entering the catalyst bed for sorption. The flue gas can be cooled by any suitable cooler, but an air-cooled shell-and-tube heat exchanger having the flue gas within the tubes is preferred. The temperature of the flue gas is generally from 150 to 900° F. (66 to 482° C.) and preferably from 300 to 500° F. (150 to 260° C.). In order to maximize heat integration and energy efficiency between the catalyst beds in which sorption and combustion are occurring, the flue gas leaving the catalyst bed in which combustion is occurring can be cooled by exchanging heat with the regenerant gas entering the catalyst bed in which combustion is occurring. Thus, a large portion of the required duty to heat the regenerant gas to combustion temperatures can be supplied by the flue gas. If, even after heat exchanging, the temperature of the flue gas is still higher than the desired temperature for passing to the catalyst bed in which sorption is occurring, then a trim flue gas cooler may be employed. Likewise, if the regenerant gas has not been sufficiently heated then a trim regenerant gas heater may be used to achieve the desired inlet temperature for the catalyst bed in which combustion is occurring.

The temperature in the catalyst bed in which sorption occurs and in any coolers and heat exchangers if present is preferably maintained above the dew point temperature of the flue gas in order to minimize the possibility of condensing corrosive acidic liquid in any equipment. The temperature of the cooled flue gas is generally from 150 to 900° F. (66 to 482° C.) and preferably from 300 to 500° F. (150 to 260° C.). The temperature of the spent catalyst prior to the passage of the cooled flue gas to the catalyst bed for sorption is generally from 150 to 900° F. (66 to 482° C.) and preferably from 300 to 500° F. (150 to 260° C.). Although in principle the heat of sorption of the chloro-species on the spent catalyst also influences the temperature of the catalyst bed in which sorption occurs, it is believed that the heat of sorption is not a significant factor relative to the flow rates and temperatures of the streams entering and leaving the catalyst bed for sorption.

A lower pressure in the catalyst bed in which sorption is occurring relative to the catalyst bed in which combustion is occurring can be achieved by various methods. The simplest method is using a pressure-reducing valve in the flue gas conduit between the outlet of the catalyst bed in which combustion is occurring and the inlet of the catalyst bed in which chloro-species are being sorbed. The pressure of the catalyst bed in which chloro-species are sorbed is generally form 0 to 500 psi (0 to 3447 kPa) absolute and preferably from 15 to 100 psi (103 to 689 kPa). The pressure of the catalyst bed in which sorption is occurring is generally from 5 to 100 psi (34 t 689 kPa), and preferably from 15 to 50 psi (103 to 344 kPa) less than the pressure of the catalyst bed in which combustion is occurring. Another method is especially adaptable to many existing cyclic regeneration processes that employ a recycle compressor to circulate regenerant gases through the catalyst bed in which combustion is occurring. In this method, the recycle compressor takes suction from the catalyst bed in which sorption is occurring and discharges to the catalyst bed in which combustion is occurring. This method of decreasing the pressure of the catalyst bed in which sorption is occurring be advantageously combined with cooling the flue gas. By passing the flue gas stream through a cooler that cools and at the same time causes a pressure drop in the flue gas stream, both the temperature and the pressure of the catalyst bed in which sorption is occurring can be decreased.

A decrease in the water content of the flue gas that contacts the spent catalyst promotes sorption of chloro-species by decreasing the water that is present and capable of competing with the chloro-species for sorption on the spent catalyst particles. Although not necessary, drying the flue gas stream prior to its entering the catalyst bed in which sorption is occurring is a preferred method of performing this invention. The water in the flue gas can be removed by passing the flue gas stream through an adsorbent such as silica gel that preferentially adsorbs water but not chloro-species. Although silica gel deteriorates over time in the presence of water and some chloro-species, a bed of silica gel can be used or sacrificed to remove water from the flue gas until the silica gel becomes unusable.

The ability of the catalyst to sorb chloro-species during sorption can also be enhanced by drying the spent catalyst prior to its use for sorption. Water that is already sorbed on the spent catalyst before the catalyst is used for sorption occupies sites that would otherwise be available for sorption of chloro-species. Thus, as with drying the flue gas, drying the spent catalyst is a preferred but not necessary method of performing this invention. This drying step can comprise contacting the spent catalyst with a hot, dry gas such as nitrogen. The water content of the spent catalyst is generally less than 1 wt-% and preferably less than 0.1 wt-%. For a typical spent hydrocarbon conversion catalyst, however, the water content is usually less than 0.1 wt-% and is therefore neither a significant factor nor an important variable for chloride sorption.

This invention is not limited to cyclic regeneration operations in which the regeneration and sorption steps occur in the gas phase. Rather, it is believed that the regeneration conditions can include conditions in which the regenerant stream, the flue stream, or both are at least partially in the liquid phase. Likewise, it is believed that the sorption conditions can include conditions in which the flue stream, the effluent stream, or both are at least partially in a liquid phase. Nevertheless, gas phase conditions are very common for cyclic regeneration operation in the hydrocarbon processing industry and are preferred.

It is not a necessary element of this invention that any portion of the effluent gas stream form the regenerant gas stream or provide any portion of the regenerant gas stream. In other words, the benefit of this invention can be achieved regardless of whether any portion of the effluent gas stream is recycled, directly or indirectly, from the catalyst bed in which sorption is occurring to the catalyst bed in which regeneration is occurring. The benefit of this invention is achieved when chloro-species are removed from the flue gas stream of a catalyst bed in which regeneration is occurring by sorption on catalyst that has not yet been regenerated. This benefit is achieved even if none of the effluent gas stream from the catalyst bed in which sorption is occurring is recycled to the catalyst bed in which regeneration is occurring. The benefit is the decrease in the concentration of chloro-species of the flue gas stream, without regard for the purpose to which the effluent gas stream having the decreased concentration of chloro-species is subsequently employed. Of course, in many commercial cyclic regeneration operations, generally more than 50% and often more than 90% of the gas that passes through catalyst beds in which regeneration is occurring is gas that is recycled by a recycle compressor. In processes such as these, this invention can be used to remove chloro-species from the flue gas stream in order that the gas stream that is recycled by the recycle compressor has a decreased concentration of chloro-species relative to the flue gas and poses a minimal risk of damage to the recycle compressor.

The make-up gas that enters a cyclic regeneration operation during combustion contains oxygen. There are some advantages to raising the concentration of oxygen in the make-up gas stream. The concentration of oxygen in the catalyst bed which is undergoing coke combustion depends on the amount of oxygen added to the combustion zone. By increasing the concentration of oxygen in the make-up gas, the volumetric flow rate of make-up gas that must be added to the cyclic regeneration process in order to maintain a given oxygen concentration in the combustion zone is decreased. One consequence of the addition of less make-up gas is a decrease in the volumetric flow rate of gas vented from the cyclic regeneration process. Thus, if the gas stream that is vented from the process is passed to a supplemental means of removal of chloro-species in order to further remove chloro-species from the vent gas stream, this decrease in flow rate of the vent gas stream generally decreases the capital and operating expense of that supplemental means. Accordingly, a preferred embodiment of this invention uses an oxygen-enriched air stream for the make-up gas during combustion. A number of processes are known for enriching air streams with oxygen. These processes can use selective adsorbents, gas permeable membranes or a combination of both to generate such streams. One such process that uses a gas permeable membrane to enrich an oxygen stream and produce a non-permeate stream with an increased nitrogen concentration is shown in U.S. Pat. No. 4,787,919, the teachings of which are herein incorporated by reference. Additional diffusion membranes for the separation of gases are also shown in U.S. Pat. No. 3,830,733, the teachings of which are incorporated by reference. These and other commercially available processes can economically produce oxygen-enriched gas streams having concentrations of 39 mole percent. Air separation processes are beneficial since they provide oxygen-enriched streams that can be used in the combustion step of a cyclic regeneration operation. Nevertheless, this invention does not require the use of any particular source of oxygen-enriched gas streams for use in the combustion step.

Figure 1A:
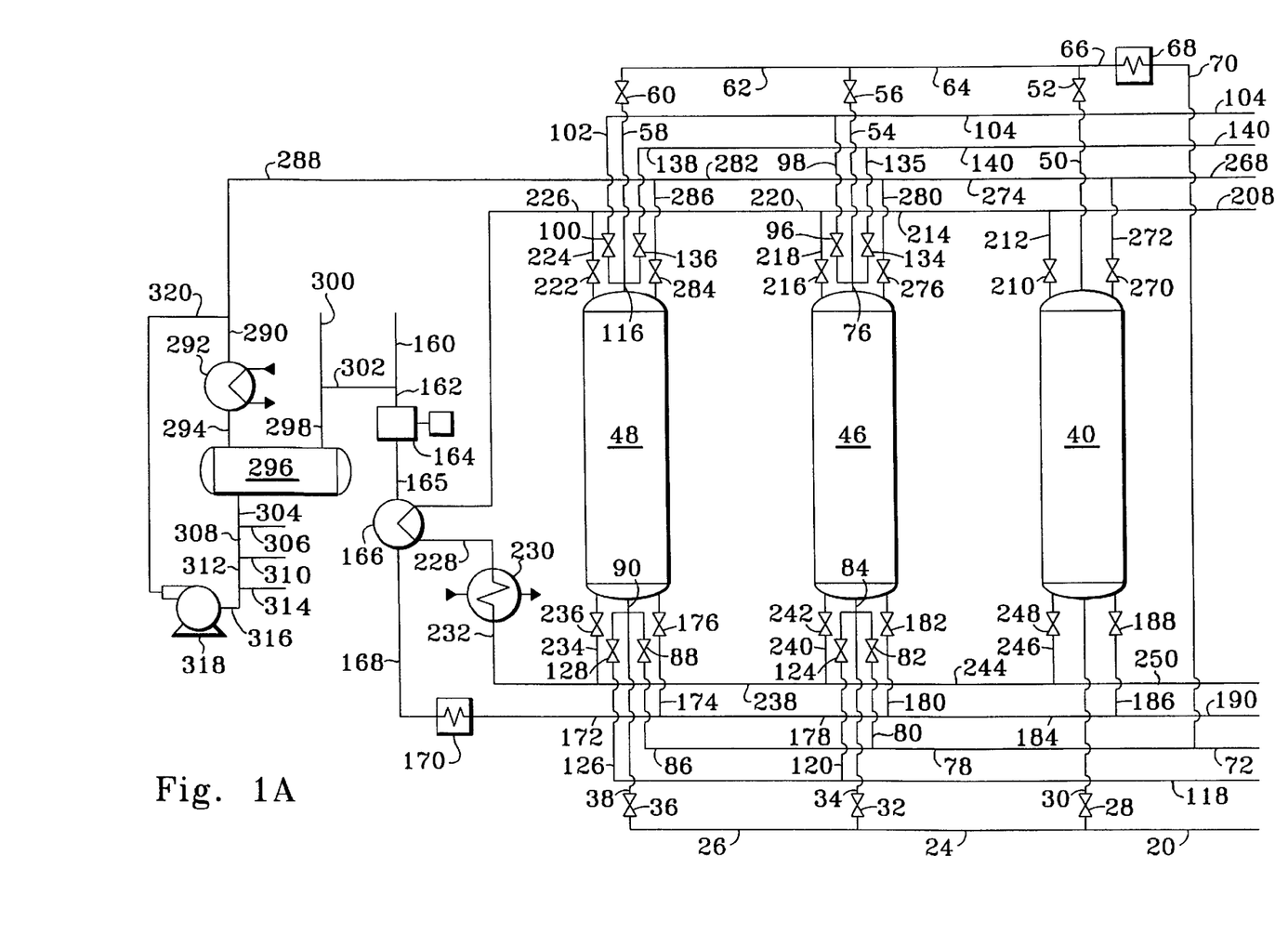
FIGS. 1A and 1B are a schematic illustration of an embodiment of this invention in which a reforming process with cyclic catalyst regeneration employs three on-stream catalyst beds and two off-stream catalyst beds.
Figure 1B:
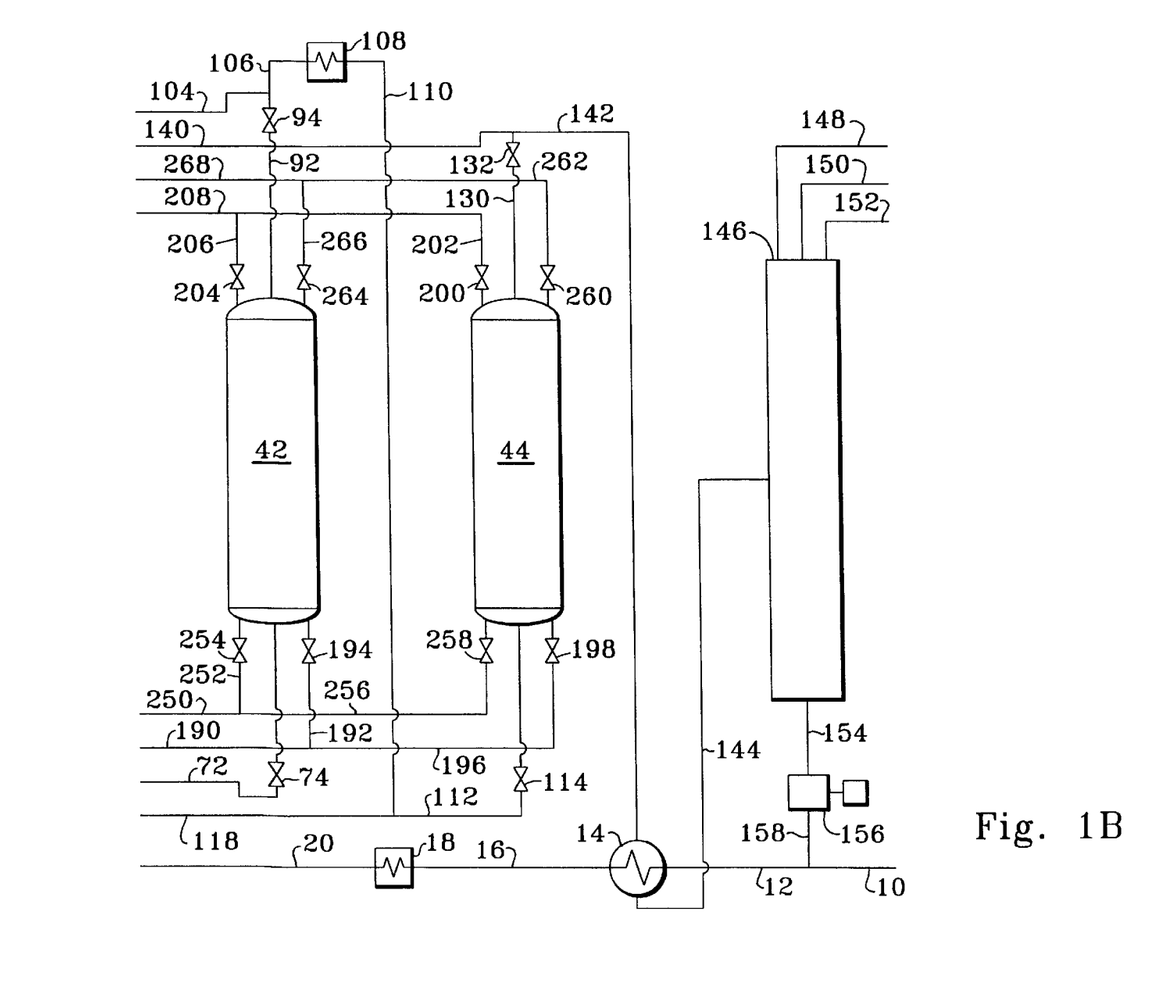

FIGS. 1A and 1B illustrate a cyclic reforming process that uses the reforming catalyst contained in an off-stream catalyst bed to remove chloro-species from the flue gas stream leaving another off-stream catalyst bed containing reforming catalyst that is being regenerated. Starting with the flow of hydrocarbons, a naphtha feedstock is charged to the process through line 10. The feedstock combines with hydrogen-containing recycle gas that is flowing through line 158 to provide a combined feed stream flowing through line 12. The combined feed stream is heated and at least partially vaporized in heat exchanger 14 by heat transferred from the catalyst bed effluent stream flowing through line 142. The combined feed stream passes through line 16 to heater 18, where the combined feed stream is heated further to reaction temperature. The combined feed stream passes through lines 20 and 30 to catalyst bed 40, valve 28 being open and valves 32 and 36 being closed. Details of the contacting beds and other internals of catalyst bed 40 and the other four catalyst beds, 42, 44, 46, and 48, are well known to those skilled in the art of hydrocarbon processing. Catalyst bed 40 contains reforming catalyst that has previously been brought to reaction temperature and pressure by means that are not shown but are well known in the art, such as by circulating hot hydrogen or hot hydrocarbons through the catalyst bed. The combined feed is introduced to catalyst bed 40. Partially converted combined feed is withdrawn from catalyst bed 40 at a temperature lower than the inlet temperature of the combined feed because the reforming reactions are endothermic. Valve 52 is open and valves 56, 60, 210, and 270 are closed, and hence the partially converted combined feed passes through lines 50 and 66 to interheater 68 wherein it is reheated to reaction temperature. The partially converted combined feed passes through lines 70 and 72 to catalyst bed 42, valve 74 being open and valves 82 and 88 being closed. Catalyst bed 42 also contains reforming catalyst at reaction temperature and pressure. The partially converted combined feed is introduced to catalyst bed 42 wherein endothermic reforming reactions occur. Partially converted combined feed is withdrawn from catalyst bed 42 and passes through lines 92 and 106 to interheater 108 wherein it is again reheated to reaction temperature. Valve 94 is open and valves 96, 100, 204, and 264 are closed. After reheating, the partially converted combined feed passes through lines 110 and 112 to catalyst bed 44, valve 114 being open and valves 124 and 128 being closed. It is introduced to catalyst bed 44 which also contains reforming catalyst which is also at reaction temperature and pressure and which promotes more reforming reactions to occur. With valve 132 being open and valves 134 and 136 being closed, the catalyst bed effluent stream withdrawn from catalyst bed 44 passes through lines 130 and 142 to heat exchanger 14, wherein the catalyst bed effluent stream is cooled by transferring heat to the combined feed stream, as described previously. The cooled catalyst bed effluent passes through line 144 to the gas separation and product fractionation system 146.

Numerous systems that are suitable for use as system 146 are known to persons of ordinary skill in the art. In system 146, the cooled catalyst bed effluent is separated into a gas containing hydrogen and $C_5$ and lighter hydrocarbons and condensed liquids containing some $C_1$–$C_4$ hydrocarbons but mainly $C_5$ and heavier hydrocarbons. The gas stream is divided into a net gas stream withdrawn through line 148 and a recycle gas stream withdrawn through line 154. The recycle gas stream passes through line 154 to compressor 156, which discharges the recycle gas through line 158 to combine with the naphtha feedstock as described previously. The condensed liquids are fractionated to produce a liquid $C_1$–$C_4$ hydrocarbon stream withdrawn through line 150 and a liquid $C_5$+reformed naphtha product stream withdrawn through line 152. The particular details of the gas separation and product fractionation system 146 need not be described in further detail herein because they are not an essential part of this invention and are well known to persons of ordinary skill in the art of reforming processes.

After the catalyst beds 40, 42, and 44 have been on-stream for several days, the activity or selectivity of the reforming catalyst in the catalyst beds declines, especially in the last catalyst bed 44. This decline in the ability of the catalyst to reform is usually reflected in a decline in the octane number of the reformed naphtha product. Although this decline in octane can be minimized by increasing the catalyst bed inlet temperature, or by decreasing the charge rate, to one or more of the catalyst beds, the decline is usually corrected by periodically regenerating the catalyst. The final catalyst bed may require regeneration more frequently than the first catalyst bed, and the system in FIGS. 1A and 1B is one in which the alternate, off-stream catalyst beds 46 and 48 can take the place of any one of the on-stream catalyst beds 40, 42, and 44 by an arrangement of valves and connections. See U.S. Pat. No. 2,773,014. Thus, after catalyst beds 40, 42, and 44 have been on-stream for one or two days, the fresh catalyst in off-stream catalyst bed 48 may be brought to reforming reaction temperature and pressure as described previously. Then, reheated partially converted combined feed flowing through line 110 is introduced to catalyst bed 48 by opening valves 128 and 136 and by closing valve 114. Immediately prior to closing valve 114, catalyst beds 44 and 48 are operating in parallel, both receiving partially converted combined feed from line 110 and both discharging to line 142. Immediately after closing valve 114 and prior to closing valve 132, catalyst bed 44 may be purged of hydrocarbon by introducing hot hydrogen-containing gas to catalyst bed 44 by means not shown in FIGS. 1A and 1B. When purging is complete, valve 132 is closed. Thus, the partially converted combined feed flowing through line 110 passes to catalyst bed 48 through lines 118, 126 and 90. The catalyst bed effluent stream to the heat exchanger 14 no longer comes from catalyst bed 44 but instead from catalyst bed 48 through lines 116, 138, 140, and 142, with valves 60, 100, 132, 134, 222, and 284 being closed and valve 136 being open.

It should be pointed out that after the catalyst beds 40, 42, and 44 had been on-stream for several days, off-stream catalyst bed 48 could have taken the place of either on-stream catalyst beds 40 and 42 instead of on-stream catalyst bed 44. Thus, in a manner similar to that described for replacing on-stream catalyst bed 44 with catalyst bed 48, off-stream catalyst bed 48 could have taken the place of on-stream catalyst bed 42 by opening valves 88 and 100 and closing valves 74 and 94. In that case, the partially converted combined feed flowing through line 70 would have passed to catalyst bed 48 through lines 78, 86, and 90, and the partially converted combined feed that then would have been withdrawn from catalyst bed 48 would have passed to heater 108 through lines 116, 102, 104, and 106. Alternatively, off-stream catalyst bed 48 could have taken the place of on-stream catalyst bed 40 by opening valves by opening valves 36 and 60 and closing valves 28 and 52. In that case, the combined feed flowing through line 20 would have passed to catalyst bed 48 through lines 24, 26, 38, and 90, and the partially converted combined feed that then would have been withdrawn from catalyst bed 48 would have passed to heater 68 through lines 116, 58, 62, 64 and 66.

After the catalyst beds 40, 42, and 48 have been on-stream for several days, off-stream catalyst bed 46 can take the place of catalyst bed 42 by opening valves 82 and 96 and closing valves 74 and 94. This leaves catalyst beds 40, 46, and 48 on-stream and catalyst beds 42 and 44 off-stream. Thus, the partially converted combined feed stream from interheater 68 is not passing to catalyst bed 42 but instead to catalyst bed 46 through lines 70, 78, 80 and 84, with valve 74 and 88 being closed and valve 82 being open. Also, the partially converted combined feed stream to interheater 108 is now not coming from catalyst bed 42 but instead from catalyst bed 46 through lines 76, 98, 104, and 106, with valves 56, 94, 100, 134, 216, and 276 being closed and valve 96 being open. In a similar manner to that described previously for catalyst bed 48, off-stream catalyst bed 46 could have taken the place of either on-stream catalyst beds 40 or 48 instead of on-stream catalyst bed 42. Thus, off-stream catalyst bed 46 could have taken the place of on-stream catalyst bed 40 by opening valves 32 and 56 and closing valves 28 and 52. In that case, the combined feed flowing through line 20 would have passed to catalyst bed 46 through lines 24, 34 and 84, and the partially converted combined feed that then would have been withdrawn from catalyst bed 46 would have passed to heater 68 through lines 76, 54, 64 and 66. Alternatively, off-stream catalyst bed 46 could have taken the place of on-stream catalyst bed 48 by opening valves 124 and 134 and closing valves 128 and 136. In that case, the partially converted combined feed flowing through line 110 would have passed to catalyst bed 46 through lines 118, 120, and 84, and the partially converted combined feed that then would have been withdrawn from catalyst bed 46 would have passed to heat exchanger 14 through lines 76, 135, 140, and 142.

Referring next to the regeneration of off-stream catalyst beds, the process in FIGS. 1A and 1B provides four connections per catalyst bed for each of four gas streams that are associated with regeneration. All five catalyst beds are provided with these gas connections in order that each on-stream catalyst bed can be replaced with an off-stream catalyst bed, taken off-stream, and regenerated. The four gas streams are the regenerant gas stream, the flue gas stream containing chloro-species, the cooled flue gas stream, and the effluent gas stream which has a lower concentration of chloro-species relative to the flue gas stream.

For the regenerant gas, the outlet of regeneration heater 170 is equipped with connections to provide regenerant gas through line 172 to any of the five catalyst beds. Thus, regenerant gas from heater 170 can flow to catalyst bed 48 through lines 172 and 174 and valve 176; to catalyst bed 46 through lines 172, 178, and 180 and valve 182; to catalyst bed 40 through lines 172, 178, 184, and 186, and valve 188; to catalyst bed 42 through lines 172, 178, 184, 190, and 192, and valve 194; and to catalyst bed 44 through lines 172, 178, 184, 190, and 196, and valve 198.

For the flue gas, heat exchanger 166 is equipped with connections in accord with this invention to collect flue gas through line 226 from all five catalyst beds. Thus, flue gas to exchanger 166 can flow from catalyst bed 48 through lines 224 and 226 and valve 222; from catalyst bed 46 through lines 218, 220, and 226 and valve 216; from catalyst bed 40 through lines 212, 214, 220, and 226 and valve 210; from catalyst bed 42 through lines 206, 208, 214, 220, and 226, and valve 204; and from catalyst bed 44 through lines 202, 208, 214, 220, and 226, and valve 200.

For the cooled flue gas stream, flue gas cooler 230 is equipped with connections in accord with this invention to provide cooled flue gas through line 232 to all five catalyst beds. Thus, cooled flue gas from flue gas cooler 230 can flow to catalyst bed 48 through lines 232 and 234 and valve 236; to catalyst bed 46 through lines 232, 238, and 240 and valve 242; to catalyst bed 40 through lines 232, 238, 244, 246, and valve 248; to catalyst bed 42 through lines 232, 238, 244, 250, and 252, and valve 254; and to catalyst bed 44 through lines 232, 238, 244, 250, and 256, and valve 258.

Lastly, for the effluent gas, effluent gas heat exchanger 292 is equipped with connections in accord with this invention to collect effluent gas through lines 288 and 290 from all five catalyst beds. Thus, effluent gas to exchanger 292 can flow from catalyst bed 48 through lines 286, 288, and 290 and valve 284; from catalyst bed 46 through lines 280, 282, 288, and 290, and valve 276; from catalyst bed 40 through lines 272, 274, 282, 288, and 290, and valve 270; from catalyst bed 42 through lines 266, 268, 274, 282, 288, and 290, and valve 264; and from catalyst bed 44 through lines 262, 268, 274, 282, 288, and 290, and valve 260.

The description that follows describes the case where catalyst beds 42 and 44 are off-stream, with catalyst bed 44 undergoing regeneration by coke combustion and with catalyst bed 42 sorbing chloro-species from the cooled flue gas leaving catalyst bed 44. From the preceding description, however, it should be clear that connections are provided so that catalyst bed 46 or 48 could be regenerated in the place of catalyst bed 44. Likewise, it should be evident that catalyst bed 46 or 48 could take the place of catalyst bed 42 and sorb chloro-species from the cooled flue gas leaving the catalyst bed being regenerated, which is catalyst bed 44 in the description that follows. Thus, it is not intended that this description limit the scope of the invention as set forth in the claims.

Make-up gas for coke combustion is typically ambient air which is supplied to the process through line 160 from a source not shown that typically comprises an air compressor and an air drier. In a preferred embodiment, the make-up gas flowing in line 160 is an oxygen-enriched gas which is produced from dried ambient air by a gas separation system. Generally, the make-up gas stream is added to the process at a rate of addition generally equal to the rate of the gas venting from line 300. The make-up air combines with the circulating gases flowing in line 302 to form a recycle gas stream, which passes to recycle compressor 164 through line 162. From compressor 164, the recycle gas stream flows through line 165 to heat exchanger 166 wherein the recycle gas stream is heated by heat transferred from the circulating flue gas stream flowing through line 226. The recycle gas stream passes through line 168 to heater 170, where the recycle gas stream is heated further to a catalyst bed inlet temperature for coke combustion, which is at a temperature of typically from 700 to 1000° F. (371 to 538° C.) and preferably from 750 to 900° F. (399 to 482° C.) and at a pressure of typically from 14.7 to 155 psi (101 to 1069 kPa) absolute. The concentration of oxygen in the inlet recycle gas stream is typically 0.3 to 5.0 mol-% oxygen, which can be measured by an oxygen analyzer not shown at the outlet of heater 170 and which is usually controlled by regulating the flow rate of make-up air through line 160. The heated recycle gas stream flows from heater 170 and is introduced to catalyst bed 44 through lines 172, 178, 184, 190 and 196, valve 198 being open, and valves 176, 182, 188, and 194 being closed.

When the heated regenerant gas contacts the coke on the catalyst within catalyst bed 44, the coke begins to burn. The flue gas produced is withdrawn from catalyst bed 44 through line 202, valve 200 being open and valves 132 and 260 being closed. In the embodiment of the invention shown in FIGS. 1A and 1B, the flue gas stream is cooled prior to passage of the flue gas stream to another off-stream catalyst bed for sorption of the chloro-species. Although the flue gas stream is cooled, the temperature in any coolers and heat exchangers if present and in the off-stream catalyst bed in which sorption occurs is preferably maintained above the dew point temperature of the flue gas in order to minimize the possibility of condensing corrosive acidic liquid in any equipment. Accordingly, the flue gas in line 202 passes to heat exchanger 166 through lines 208, 214, 220 and 226, valves 204, 210, 216 and 222 being closed. By transferring heat from the flue gas to the recycle gas, heat exchanger 166 cools the flue gas to a temperature of generally from 500 to 900° F. (260 to 482° C.) and preferably from 500 to 700° F. (260 to 371° C.). Next, the flue gas passes through line 228 to a water-cooled shell-and-tube heat exchanger 230, which transfers additional heat from the flue gas to cooling water in order to further cool the flue gas to an inlet temperature of catalyst bed 42 in which chloro-species are sorbed from the flue gas. Suitable inlet temperatures of the cooled flue gas to catalyst bed 42 are generally from 150 to 900° F. (66 to 482° C.) and preferably from 300 to 500° F. (150 to 260° C.). In the cooled flue gas stream, the concentration of hydrogen chloride can be from 100 to 100000 mol-ppm, and preferably from 500 to 3000 mol-ppm. The concentration of chlorine in the cooled flue gas stream can be from 1 to 1000 mol-ppm, and preferably from 10 to 300 mol-ppm. These ranges of concentrations of hydrogen chloride and chlorine in the cooled flue gas stream are exemplary and do not limit the scope of applicability of this invention. The increase in chloride content of a catalyst that is sorbing hydrogen chloride and chlorine depends not only on the composition of the cooled flue gas stream but also on the gas hourly space velocity, the elapsed time during which the catalyst is exposed to the cooled flue gas stream, and other sorption conditions.

The cooled flue gas stream passes from heat exchanger 230 through lines 232, 238, 244, 250 and 252 to catalyst bed 42, valve 254 being open and valves 236, 242, 248, and 258 being closed. When the cooled flue gas contacts the catalyst within catalyst bed 42, the chloro-species are sorbed on the catalyst and an effluent gas stream is produced. The temperature of the catalyst within catalyst bed 42 during sorption is generally from 150 to 900° F. (66 to 482° C.) and preferably from 300 to 500° F. (150 to 260° C.). Although other factors may influence the temperature at which sorption of the chloro-species on the catalyst occurs, preferably the temperature of the catalyst in catalyst bed 42 is controlled by the inlet temperature of the cooled flue gas stream. The factors that can influence the temperature within the catalyst bed during sorption include not only the temperature of the cooled flue gas stream, but also the thermal mass flow rate of the cooled flue gas stream, the thermal mass of the catalyst, the temperature of the catalyst, the elapsed time of contacting between the cooled flue gas stream and the catalyst, and heat losses from the catalyst bed. A cooling step can be used prior to the sorption step in order to cool the catalyst from the reforming reaction temperature to the desired sorption temperature. Such a cooling step can immediately follow after the previously described purge step that is conducted when a catalyst bed is taken off-stream in order to purge hydrocarbons from the catalyst. Thus, although initially the inlet temperature of the hydrogen-containing purge gas will usually be relatively high in order to ensure that hydrocarbons are purged from the catalyst, after a sufficient quantity of hydrocarbon is purged from the catalyst bed the temperature of the hydrogen-containing purge gas can be reduced in order to cool the catalyst in the catalyst bed prior to the sorption step. Although this cooling step is not necessary, it is preferred in order to maximize the sorption of chloro-species onto the catalyst once the cooled flue gas stream begins to contact the catalyst.

The effluent gas stream is withdrawn from catalyst bed 42 through line 266, valve 264 being open and valves 94 and 204 being closed. The effluent gas then passes to heat exchanger 292 through lines 268, 274, 282, 288, and 290, valves 260, 270, 276 and 284 being closed. Prior to entering heat exchanger 292, the effluent gas stream flowing in line 288 is contacted with an aqueous caustic stream containing sodium hydroxide. The aqueous caustic stream flows through a line 320 and is dispersed in the effluent gas stream. The combined stream of effluent gas and aqueous caustic solution flows through line 290 and into the heat exchanger 292. Heat exchanger 292 cools the combined stream to a suitable suction temperature for recycle compressor 164, which is generally from 40 to 150° F. (4 to 66° C.) and preferably from 60 to 100° F. (16 to 38° C.). The aqueous caustic stream cools the effluent gas stream somewhat. But more importantly the aqueous caustic solution neutralizes hydrogen chloride and chlorine present in the effluent gas stream, thereby minimizing the possibility of hydrochloric acid corrosion in lines 290 and heat exchanger 292. After cooling in heat exchanger 292, the combined stream of effluent gas and aqueous caustic solution passes through line 294 and into gas-liquid separator 296. An aqueous caustic stream comprising sodium chloride salt leaves the separator 296 through line 304. A spent aqueous stream can be withdrawn through line 306 in order to reject the sodium chloride salt from the process. A make-up aqueous caustic stream containing sodium hydroxide can be added to the stream in line 308 through line 310. Make-up water can be added to the stream in line 312 through line 314. The aqueous caustic stream passes through line 316 to pump 318, which recirculates the aqueous caustic stream through line 320. The aqueous caustic stream combines with the effluent gas in line 288, as described previously.

A gas stream exits the separator 296 through line 298. Because most of the hydrogen chloride and chlorine that was originally in the flue gas stream leaving catalyst bed 44 has been removed by sorption in catalyst bed 42 and by caustic scrubbing in line 290, exchanger 292, and line 294, the gas stream flowing through line 298 contains low concentrations of chlorine and hydrogen chloride. With caustic scrubbing, the gas stream flowing through line 298 typically contains less than 10 mol-ppm hydrogen chloride and less than 0.1 mol-ppm chlorine. This gas stream is also depleted in oxygen because the combustion of coke in catalyst bed 44 consumed oxygen. In order to replenish the oxygen, a portion of the gas stream flowing through line 298 is vented through line 300, and make-up air is added through line 160 to the remainder of the gas stream that flows through line 302. This forms the recycle gas stream that passes through line 162 to compressor 164, as described previously. The recycle gas typically contains from 1 to 100 mol-ppm hydrogen chloride and less than 10 mol-ppm chlorine. If higher concentrations of chlorine or hydrogen chloride in the recycle gas are desired, then a chloro-species, such as chlorine, hydrogen chloride, or a chloro-hydrocarbon which can decompose at the conditions in line 168 or 172 to form chlorine or hydrogen chloride, such as 1,1,1 trichloroethane, can be injected into the recycle gas stream into line 168 or 172.

Caustic scrubbing of the effluent gas stream flowing through line 288 serves at least three purposes. First, caustic scrubbing helps to minimize corrosion by liquids that contain hydrochloric acid and that might condense in heat exchanger 292, separator 296, and their associated equipment. Second, caustic scrubbing reduces the quantities of hydrogen chloride and chlorine that are released from the process with the gas stream that is vented through line 300. Third, caustic scrubbing decreases the likelihood of damage that chlorine and hydrogen chloride in the regeneration stream passing line 162 might cause to the internal working parts of recycle compressor 164. Although caustic scrubbing serves these three purposes, it is believed that certain situations can permit a process such as that shown in FIGS. 1A and 1B to operate without the need to contact the effluent gas stream flowing through line 288 with a neutralizing caustic stream. For example, if the heat exchanger 292, separator 296, and recycle compressor 164 can withstand the corrosive effects of the relatively low concentrations of chlorine and hydrogen chloride in the effluent gas stream, and if the quantities of chorine and hydrogen chloride that are vented from the process through line 300 are not excessive, then caustic scrubbing may not be necessary. The greater the extent that chloro-species are sorbed from the cooled flue gas stream in line 232 according to the method of this invention, the lower is the concentration of chloro-species in the effluent gas stream in line 288 and the less likely is the need for caustic scrubbing. Persons of ordinary skill in the art can determine whether it is desirable to employ caustic scrubbing as shown in FIGS. 1A and 1B and, if so, can design and build a suitable caustic scrubbing system.

When coke combustion in catalyst bed 44 is complete, other cyclic regeneration steps of the catalyst in catalyst bed 44 may take place. To the extent that these other steps result in the release of chloro-species from the catalyst in catalyst bed 44 and the presence of these chloro-species in the gas stream that is withdrawn from catalyst bed 44, catalyst bed 42 may be employed generally to continue to sorb these chloro-species in the manner described previously during the coke combustion step. However, the use of catalyst bed 42 for sorption during other cyclic regeneration steps is subject to at least two limitations. First, for a given spent catalyst and given sorption conditions, it is believed that there is an upper limit on the chloride content that the spent catalyst can sorb. Accordingly, as the content of chloride of the catalyst in catalyst bed 42 approaches that upper limit, the capacity of the catalyst to sorb more chloride becomes limited. The factors that are believed to set the upper limit on chloride content of the catalyst are the support material, surface area, pore volume, metals content, coke content, water content, and the sulfur content of the catalyst, as well as the temperature, pressure, water content, and chloro-species content of the flue gas. Second, the conditions that promote sorption of chloride on the catalyst in catalyst bed 42 generally should not cause serious or irreversible damage to the catalyst in catalyst bed 42. For example, the spent catalyst in catalyst bed 42 typically contains from 5 to 10% by weight carbon of the catalyst weight and, even though redispersion can be effected at lower oxygen concentrations, the redispersion step of a cyclic regeneration operation typically employs a redispersion recycle gas that contains from 5 to 10 mol-% oxygen. Thus, if a relatively high temperature, such as more than about from 600 to 700° F. (316 to 371° C.), is employed for sorption, the conditions within catalyst bed 42, the oxidation of the carbon on the spent catalyst in catalyst bed 42 can occur and temperatures in localized regions within the catalyst bed in catalyst bed 42 may reach 1100° F. (593° C.) or more. One problem associated with localized regions of intense coke combustion is catalyst deactivation. The combination of temperature, water vapor, and exposure time determine the useful life of the catalyst. Exposure of high surface area catalyst to high temperatures for prolonged periods of time will create a more amorphous material having a reduced surface area which in turn lowers the activity of the catalyst until it reaches a level where it is considered deactivated. Deactivation of this type is permanent, thereby rendering the catalyst unusable. When moisture is present—water is a by-product of the coke combustion—the deactivating effects of high temperature exposure are compounded. Accordingly, to the extent that at sorption conditions the flue gas causes undesirable damage to the spent catalyst in catalyst bed 42, then the use of catalyst bed 42 for sorption may be limited. A jump-over line (not shown) from line 232 to line 288 may be used to route the flue gas around catalyst bed 42 during steps in which damage to the catalyst in catalyst bed 42 would otherwise occur.

In any event, when the regeneration of the catalyst in catalyst bed 44 is complete, the catalyst in catalyst bed 44 is once again capable of performing reforming reactions and can be returned to an on-stream position, taking the place of one of on-stream catalyst beds 46 or 48. In the description that follows, catalyst bed 44 is placed on-stream taking the place of catalyst bed 48, catalyst bed 48 is taken off-stream and takes the place of catalyst bed 42 the catalyst of which is loaded with sorbed chloride, and catalyst bed 42 remains off-stream and takes the place of catalyst bed 44 in order to undergo regeneration. This step-wise switching of the position of the catalyst beds in the process flow can be conducted in a number of ways. The first step of a preferred method of switching catalyst beds involves routing the recycle gas stream from entering catalyst bed 44 to entering catalyst bed 42 and temporarily stopping flow of the flue gas stream and of the cooled flue gas stream. This is achieved by closing valves 198, 200, and 254 and opening valve 194. Thus, the regenerant gas flows from heater 170 through lines 172, 178, 184, 190, and 192 and through valve 194 to catalyst bed 42. The flue gas stream that exits catalyst bed 42 follows the flow path of the effluent gas stream described previously, flowing through line 266, valve 264 having been kept open, and through lines 268, 274, 282, 288, and 290. The gas stream then passes through exchanger 292, separator 296, compressor 164, exchanger 166, and heater 170, and is recycled as recycle gas to catalyst bed 42. The second step consists of replacing on-stream catalyst bed 48 with off-stream catalyst bed 44 in a reversal of the manner described previously for replacing on-stream catalyst bed 44 with off-stream catalyst bed 48. Thus, this second step is accomplished by opening valves 114 and 132 and closing valves 128 and 136. The third and final step consists of reestablishing the flows of the flue gas stream and of the cooled flue gas stream through catalyst beds 42 and 48. This third step is performed by opening valves 204, 236, and 284 and closing valve 264. Thus, when all three steps are complete, the three on-stream catalyst beds are catalyst beds 40, 46, and 44 as the first, second, and third reforming catalyst beds, respectively. Catalyst beds 42 and 48 are off-stream, with catalyst bed 42 undergoing regeneration and with catalyst bed 48 adsorbing chlorine and hydrogen chloride from the cooled flue gas stream of catalyst bed 42.

After the regeneration of catalyst bed 42 is complete, then of the three original on-stream catalyst beds only catalyst bed 40 remains unregenerated. In order to regenerate catalyst bed 40, three more step-wise shifts of catalyst bed positions are necessary. In the first switch, catalyst bed 42 is placed on-stream taking the place of catalyst bed 46, catalyst bed 46 is taken off-stream and takes the place of catalyst bed 48 the catalyst of which is loaded with sorbed chloride, and catalyst bed 48 remains off-stream and takes the place of catalyst bed 44 in order to undergo regeneration. First, the regenerant gas stream is routed from the inlet of catalyst bed 42 to the inlet of catalyst bed 48 and the flows of the flue gas stream and of the cooled flue gas stream are stopped temporarily. This is achieved by closing valves 194, 204, and 236 and opening valve 176, so that the regenerant gas flows from heater 170 through lines 172 and 174, and through valve 176 to catalyst bed 48. The flue gas stream that exits catalyst bed 48 flows through line 286, valve 284 having been kept open, and through lines 288 and 290. The gas stream then passes through exchanger 292, separator 296, compressor 164, exchanger 166, and heater 170, and is recycled as regenerant gas to catalyst bed 48. The second step consists of replacing on-stream catalyst bed 46 with off-stream catalyst bed 42 by opening valves 74 and 94 and closing valves 82 and 96. The final step consists of opening valves 222, 242, and 276 and closing valve 284. Thus, when all three steps are complete, the three on-stream catalyst beds are catalyst beds 40, 42, and 44 as the first, second, and third reforming catalyst beds, respectively, and the two off-stream catalyst beds are catalyst bed 48, which is undergoing regeneration, and catalyst bed 46, which is sorbing chlorine and hydrogen chloride from the cooled flue gas stream. With the method of switching catalyst beds having now been described in sufficient detail to enable a person of ordinary skill in the art to practice the invention, in the interest of brevity the last two steps of switching catalyst beds are described only briefly. In the second switch, catalyst bed 48 is placed on-stream taking the place of catalyst bed 40, catalyst bed 40 is taken off-stream and takes the place of catalyst bed 46 in sorbing chloro-species, and catalyst bed 46 remains off-stream and takes the place of catalyst bed 48 in being regenerated. In the third and final switch, catalyst bed 46 is placed on-stream taking the place of catalyst bed 44, catalyst bed 44 is taken off-stream and takes the place of catalyst bed 40 in sorbing chloro-species, and catalyst bed 40 remains off-stream and takes the place of catalyst bed 46 in being regenerated. Thus, when all three switches are complete, the three on-stream catalyst beds are catalyst beds 48, 42, and 46 as the first, second, and third reforming catalyst beds, respectively and the two off-stream catalyst beds are catalyst bed 40 which is being regenerated and catalyst bed 44 which is sorbing chlorine and hydrogen chloride. Once catalyst bed 40 is regenerated, one more switch of catalyst bed positions returns catalyst bed 40 to an on-stream position.

The method of switching catalyst bed positions that is described in the two previous paragraphs involves in its first step temporarily stopping the flows of the flue gas stream and the cooled flue gas stream and in the third and final step reestablishing the flows of these two streams. During this temporary stoppage of flow, flue gas does not flow from either of the off-stream catalyst beds through line 226 exchanger 166, line 228, and exchanger 230, and cooled flue gas does not flow from line 232 to either of the off-stream catalyst beds. Thus, during this temporary flow stoppage the head that is required of compressor 164 to circulate gas will decrease because there are no pressure losses associated with the exchangers and piping of the flue gas circuit because the compressor 164 is not circulating gas through this flue gas circuit. Accordingly, the throughput of compressor 164 may have to be temporarily reduced in order to prevent compressor 164 from surging. Persons of ordinary skill in the art of gas compression are able to adjust the operation of the compressor 164 in a manner that compensates for the temporary decrease in required head of compressor 164. Alternatively, the throughput of compressor 164 may be kept the same, provided that the recycle compressor 164 is equipped with a spill back circuit through which any excess gas throughput can be recycled from the discharge to the suction of the recycle gas compressor 164.

Although FIGS. 1A and 1B depicts a process that employs five catalyst beds with three catalyst beds on-stream and two catalyst beds off-stream, it should be understood that in other embodiments of this invention the number of catalyst beds can vary. At a minimum, however, there must be at least three catalyst beds. Where there are only three catalyst beds, one catalyst bed is on-stream and catalyzing reforming reactions, the second catalyst bed is off-stream and being regenerated, and the third catalyst bed is off-stream and sorbing chloro-species. Where there are more than three catalyst beds, various combinations of on-stream and off-stream catalyst beds are possible. For example, two or more on-stream catalyst beds can be used, and it is common in reforming processes to use three, four, or five on-stream catalyst beds. Similarly, three or more off-stream catalyst beds can be used. Although it is usually not economical to keep too many catalyst beds off-stream, it may be advantageous in some situations to simultaneously regenerate two or more catalyst beds or to simultaneously sorb chloro-species in two or more catalyst beds. Simultaneously sorbing chloro-species in more than one off-stream catalyst bed allows each off-stream catalyst bed to operate at different sorption conditions. Thus, the sorption conditions may be chosen to maximize the sorption of one chloro-species in one catalyst bed and of another chloro-species in another catalyst bed. For example, two off-stream catalyst beds can be arranged series sorption, with the flue gas first contacting a catalyst bed that sorbs chloro-species at a relatively high temperature and then passing to the second catalyst bed that sorbs the remainder of the chloro-species at a relatively low temperature.

EXAMPLES

Unless noted otherwise in the description of the examples that follows, each catalyst chloride result was obtained by analyzing one or more samples of catalyst on an as-received basis. In addition, the molar ratio of water per hydrogen chloride and the hydrogen chloride content of each gas mixture were computed by considering all chloro-species in the gas mixture as hydrogen chloride.

Three reforming catalysts were tested for chloride sorption. Catalysts 1, 2 and 3 had nominal compositions of about 0.38 wt-% platinum (volatile free) and 0.3 wt-% tin (volatile free) on a gamma alumina support. Catalysts 1 and 2 were fresh catalysts and had a nominal loss on ignition at 900° C. (1652° F.) of 0.5—1.5 wt-% and a nominal coke content of less than 0.1 wt-% (as received). Catalyst 1 had a surface area of 186 m$^2$/gram and a chloride content of 0.99 wt-%. Catalyst 2 had a surface area of 210 m$^2$/gram and a nominal chloride content of about 1.15 wt-%. Catalyst 3 was withdrawn from a commercial reforming process with a continuous regeneration section and had a loss on ignition at 900° C. (1652° F.) of 6.1 wt-%, a coke content of about 5 wt-%, a surface area of 113 m$^2$/gram, and a chloride content of 0.97 wt-%.

Example 1

Samples of Catalysts 1 and 3 were contacted with a gas mixture containing nitrogen, water, and hydrogen chloride. The gas mixture was prepared by vaporizing an aqueous hydrogen chloride solution and injecting it into a gas stream containing more than 99.9 mol-% nitrogen so that the gas mixture contained 10 mol-% water, had a molar ratio of water per hydrogen chloride of 12.5, and contained 800 mol-ppm hydrogen chloride. The sorption conditions included a temperature of 302° F. (150° C.), a pressure of 14.7 psi (101 kPa), and a superficial contact time of the gas mixture with the catalyst of 10 seconds. These sorption conditions were maintained for twelve hours. After twelve hours, the chloride content was 2.42 wt-% for the sample of Catalyst 1 and 1.87 wt-% for Catalyst 3.

Example 2

Samples of Catalysts 1 and 2 were contacted at the same sorption conditions as Example 1, except that the gas mixture contained carbon dioxide in addition to nitrogen, water, and hydrogen chloride. The gas mixture was prepared by vaporizing an aqueous hydrogen chloride solution and injecting it into a gas stream containing about 86 mol-% nitrogen and about 14 mol-% carbon dioxide so that the gas mixture contained 10 mol-% water, had a molar ratio of water per hydrogen chloride of 12.5, and contained 800 mol-ppm hydrogen chloride. After twelve hours of contacting, the sample of Catalyst 1 had a chloride content of 2.42 wt-%, which is the same as the chloride content of the sample of Catalyst 1 after contacting with nitrogen in Example 1. After twelve hours of contacting, the sample of Catalyst 2 had a chloride content of 2.57 wt-%.

Example 3

Samples of Catalysts 1 and 2 were contacted at the same sorption conditions as Example 1, except that the gas mixture had a molar ratio of water per hydrogen chloride of 24 instead of 12.5 and contained 417 mol-ppm hydrogen chloride instead of 800 mol-ppm. The gas mixture was prepared by vaporizing an aqueous hydrogen chloride solution, which was less concentrated in hydrogen chloride than the solution used in Example 1, and injecting it into a gas stream containing more than 99.9 mol-% nitrogen so that the gas mixture contained 10 mol-% water, had a molar ratio of water per hydrogen chloride of 24, and contained 417 mol-ppm hydrogen chloride. After twelve hours of contacting, the sample of Catalyst 1 had a chloride content of 2.24 wt-% which is 0.18 wt-% lower than the chloride content of the sample of Catalyst 1 after contacting in Example 1. After twelve hours of contacting, the sample of Catalyst 2 had a chloride content of 2.43 wt-%.

Example 4

Samples of Catalysts 1 and 2 were contacted at the same sorption conditions as Example 1, except that the sorption temperature was 572° F. (300° C.) instead of 302° F. (150° C.). After twelve hours of contacting, the sample of Catalyst 1 had a chloride content of 1.80 wt-%, which is 0.62 wt-% lower than the chloride content of the sample of Catalyst 1 after contacting in Example 1. After twelve hours of contacting, the sample of Catalyst 2 had a chloride content of 1.97 wt-%.

Example 5

A sample of Catalyst 1 was contacted with a pretreating gas containing air, water, and hydrogen chloride. The pretreating gas was prepared by vaporizing a 0.6 M aqueous hydrogen chloride solution and injecting it into an air stream. The hydrogen chloride solution was injected at a liquid volumetric rate of 45 cc/hour into the air stream that was flowing at a gas volumetric rate of 3 liter/minute. The pretreatment conditions included a temperature of 977° F. (525° C.) and were maintained for two hours. After two hours, the chloride content of the sample of Catalyst 1 was 0.85 wt-%.

After pretreatment, the sample of Catalyst 1 was contacted at the same sorption conditions as Example 1, except that the gas mixture contained 5 mol-% water, the gas mixture had a molar ratio of water per hydrogen chloride of 300, the gas mixture contained 167 mol-ppm hydrogen chloride, and the sorption temperature was 482° F. (250° C.). After about four days of contacting, the sample of Catalyst 1 had a chloride content of 1.25 wt-%.

What is claimed is:

1. A sorptive method for recovering chloro-species from an outlet stream of a cyclic regeneration operation of a hydrocarbon conversion process, said method comprising:

(a) contacting hydrocarbons with hydrocarbon conversion catalyst in a first catalyst bed to convert hydrocarbons;

(b) at least partially regenerating hydrocarbon conversion catalyst containing chloride and removing at least a portion of the chloride from hydrocarbon conversion catalyst in a second catalyst bed at regeneration conditions, and withdrawing an outlet stream comprising chloro-species from said second catalyst bed;

(c) passing at least a portion of said outlet stream comprising chloro-species to a third catalyst bed containing hydrocarbon conversion catalyst, sorbing at least a portion of the chloro-species in said at least a portion of said outlet stream on hydrocarbon conversion catalyst in said third catalyst bed at sorption conditions, and withdrawing from said third catalyst bed an effluent stream having a decreased concentration of chloro-species relative to said at least a portion of said outlet stream; and (d) periodically shifting the functions of said first, second, and third catalyst beds by operating said first catalyst bed to function as said third catalyst bed in Step (c), operating said third catalyst bed to function as said second catalyst bed in Step (b), and operating said second catalyst bed to function as said first catalyst bed in Step (a).

2. The method of claim 1 wherein at least a portion of said outlet stream is passed to said second catalyst bed.

3. The method of claim 1 wherein hydrocarbon conversion catalyst in said third catalyst bed contains carbon.

4. The method of claim 1 wherein hydrocarbon conversion catalyst in said first catalyst bed contains chloride when the function of said first catalyst bed is shifted so as to function as said third catalyst bed.

5. The method of claim 1 further characterized in that in Step (b) hydrocarbon conversion catalyst in said second catalyst bed contains carbon, oxygen is passed to said second catalyst bed, and said regeneration conditions are sufficient to remove at least a portion of the carbon from hydrocarbon conversion catalyst in said second catalyst bed by combustion.

6. The method of claim 1 further characterized in that hydrocarbon conversion catalyst in said second catalyst bed contains a metal, chlorine is passed to said second catalyst bed in Step (b), and said regeneration conditions are sufficient to disperse at least a portion of the metal in said second catalyst bed.

7. The method of claim 1 further characterized in that hydrocarbon conversion catalyst in said second catalyst bed contains a metal, a reducing agent is passed to said second catalyst bed in Step (b), and said regeneration conditions are sufficient to reduce at least a portion of the metal in said second catalyst bed.

8. The method of claim 1 further characterized in that said sorption conditions comprise a decreased temperature relative to said regeneration conditions.

9. The method of claim 8 further characterized in that said at least a portion of said outlet stream is cooled prior to passing to said third catalyst bed.

10. The method of claim 1 further characterized in that said sorption conditions comprise a decreased pressure relative to said regeneration conditions.

11. The method of claim 1 further characterized in that said portion of said outlet stream comprises water and at least a portion of the water is removed prior to passing to said third catalyst bed.

12. The method of claim 1 further characterized in that said first catalyst bed, said second catalyst bed, or said third catalyst bed contains hydrocarbon conversion catalyst comprising alumina.

13. The method of claim 1 further characterized in that said first catalyst bed, said second catalyst bed, or said third catalyst bed contains hydrocarbon conversion catalyst comprising a molecular sieve, silica-alumina, or a clay.

14. The method of claim 1 wherein at least 50 wt-% of the chloro-species is removed from said at least a portion of said outlet stream.

15. The method of claim 1 further characterized in that hydrocarbon conversion catalyst in said second catalyst bed contains carbon, at least a portion of said outlet stream and a make-up stream having an oxygen concentration of less than 39 mol-% are passed to said second catalyst bed, and said regeneration conditions are sufficient to remove at least a portion of the carbon from hydrocarbon conversion catalyst in said second catalyst bed by combustion.

16. The method of claim 1 wherein said converting of hydrocarbons comprises reforming, dehydrogenation, Isomerization, alkylation, or transalkylation.

17. The method of claim 1 wherein chloro-species comprises hydrogen chloride or chlorine.

18. A sorptive method for recovering chlorine or hydrogen chloride from the flue gas stream of a cyclic regeneration operation of a hydrocarbon reforming process having at least three reforming catalyst beds, such that, in each step of each cycle in a series of successive cycles, one reforming catalyst bed operates in hydrocarbon reforming mode, another reforming catalyst bed operates in sorption mode, and yet another reforming catalyst bed operates in regeneration mode, said method comprising:

(a) passing a feed stream comprising hydrocarbons having a boiling range of from 180 to 400° F. to a first reforming catalyst bed containing reforming catalyst comprising alumina, platinum metal, and chloride, reforming said hydrocarbons in said first reforming catalyst bed at reforming conditions sufficient to deposit coke on reforming catalyst in said first reforming catalyst bed, withdrawing an exit stream comprising reformed hydrocarbons from said first reforming catalyst bed, passing said exit stream to a first separation zone, and recovering from said first separation zone a product stream comprising reformed hydrocarbons;

(b) passing a regenerant stream comprising nitrogen, oxygen, and at least one of hydrogen chloride and chlorine to a second reforming catalyst bed containing reforming catalyst comprising chloride and having coke deposited thereon, removing at least a portion of the coke and the chloride at regeneration conditions from reforming catalyst in said second reforming catalyst bed, and withdrawing a flue gas stream comprising nitrogen and at least one of chlorine and hydrogen chloride from said second reforming catalyst bed;

(c) cooling said flue gas stream to produce a cooled flue gas stream, passing said cooled flue gas stream to a third reforming catalyst bed containing reforming catalyst having coke deposited thereon, removing a portion of at least one of chlorine and hydrogen chloride from said cooled flue gas stream by sorption on reforming catalyst in said third reforming catalyst bed, and withdrawing an effluent stream comprising nitrogen and having a decreased concentration of chlorine or hydrogen chloride relative to said cooled flue gas stream; and (d) periodically shifting the functions of said first, second, and third reforming catalyst beds by operating said first reforming catalyst bed to function as said third reforming catalyst bed in Step (c), operating said third reforming catalyst bed to function as said second reforming catalyst bed in Step (b), and operating said second reforming catalyst bed to function as said first reforming catalyst bed in Step (a).

19. The method of claim 18 further characterized in that after removing at least a portion of the coke from reforming catalyst in said second reforming catalyst bed in Step (b) and prior to said operating of said second reforming catalyst bed to function as said first reforming catalyst bed in Step (a), said regenerant stream comprises chlorine and said regeneration conditions are sufficient to disperse at least a portion of the platinum metal on said reforming catalyst in said second reforming catalyst bed.

20. The method of claim 18 further characterized in that said effluent stream comprises hydrogen chloride, said effluent stream and an aqueous solution comprising a base are combined to form a combined stream, said base reacts with hydrogen chloride in said combined stream to form a salt comprising chlorine, said combined stream is passed to a second separation zone, a recycle stream comprising nitrogen and having a reduced concentration of hydrogen chloride relative to said effluent stream is withdrawn from said second separation zone, and at least a portion of said recycle stream provides at least a portion of said regenerant stream.

21. A sorptive method for recovering chloro-species from an outlet stream of a cyclic regeneration operation of a hydrocarbon conversion process, said method comprising:

(a) contacting hydrocarbons with hydrocarbon conversion catalyst in a first catalyst bed to convert hydrocarbons;

(b) at least partially regenerating hydrocarbon conversion catalyst containing chloride and removing at least a portion of the chloride from hydrocarbon conversion catalyst in a second catalyst bed at regeneration conditions, and withdrawing an outlet stream comprising chloro-species from said second catalyst bed;

(c) passing at least a portion of said outlet stream comprising chloro-species to a third catalyst bed containing hydrocarbon conversion catalyst, sorbing at least a portion of the chloro-species in said at least a portion of said outlet stream on hydrocarbon conversion catalyst in said third catalyst bed at sorption conditions, said sorption conditions comprising a sorption temperature of from 150° F. to 900° F., and withdrawing from said third catalyst bed an effluent stream having a decreased concentration of chloro-species relative to said at least a portion of said outlet stream; and (d) periodically shifting the functions of said first, second, and third catalyst beds by operating said first catalyst bed to function as said third catalyst bed in Step (c), operating said third catalyst bed to function as said second catalyst bed in Step (b), and operating said second catalyst bed to function as said first catalyst bed in Step (a).

22. The method of claim 21 wherein the sorption temperature is from 300° F. to 500° F.

* * * * *